US012057250B2

(12) United States Patent
Yan et al.

(10) Patent No.: US 12,057,250 B2
(45) Date of Patent: Aug. 6, 2024

(54) HYBRID HIGH CURRENT, SURFACE MOUNT SWING INDUCTOR AND FABRICATION METHODS

(71) Applicant: EATON INTELLIGENT POWER LIMITED, Dublin (IE)

(72) Inventors: Yipeng Yan, Pleasanton, CA (US); Dengyan Zhou, Shanghai (CN)

(73) Assignee: Eaton Intelligent Power Limited, Dublin (IE)

(*) Notice: Subject to any disclaimer, the term of this patent is extended or adjusted under 35 U.S.C. 154(b) by 650 days.

(21) Appl. No.: 17/191,956

(22) Filed: Mar. 4, 2021

(65) Prior Publication Data

US 2022/0285073 A1 Sep. 8, 2022

(51) Int. Cl.

| | |
|---|---|
| ***H01F 27/28*** | (2006.01) |
| ***H01F 27/26*** | (2006.01) |
| ***H01F 27/29*** | (2006.01) |

(52) U.S. Cl.
CPC ........... *H01F 27/26* (2013.01); *H01F 27/292* (2013.01)

(58) Field of Classification Search
CPC .... H01F 27/26; H01F 27/292; H01F 27/2847; H01F 3/14; H01F 2003/106; H01F 2027/065; H01F 3/10; H01F 38/023; H01F 27/2852
USPC ........................................ 336/221, 212
See application file for complete search history.

(56) References Cited

U.S. PATENT DOCUMENTS

| | | | | |
|---|---|---|---|---|
| 5,455,552 A | | 10/1995 | Metsler | |
| 2008/0303624 A1 | * | 12/2008 | Yamada | H01F 17/043 336/212 |
| 2012/0280778 A1 | * | 11/2012 | Lu | H01F 27/263 336/192 |
| 2017/0178794 A1 | * | 6/2017 | Yan | H01F 41/02 |
| 2020/0043643 A1 | * | 2/2020 | Yan | H01F 27/306 |

FOREIGN PATENT DOCUMENTS

| | | |
|---|---|---|
| CN | 203552851 U | 4/2014 |
| CN | 107731441 A | 2/2018 |
| JP | H10335146 A | 12/1998 |

OTHER PUBLICATIONS

International Search Report and Written Opinion for International Application No. PCT/EP2022/025082, 20 pages.

* cited by examiner

*Primary Examiner* — Shawki S Ismail
*Assistant Examiner* — Kazi S Hossain
(74) *Attorney, Agent, or Firm* — Baker Botts L.L.P.

(57) ABSTRACT

An inductor includes discrete magnetic core pieces fabricated from different magnetic materials having different magnetic properties. An inverted U-section conductive coil includes a top section and first and second legs to establish a surface mount connection to a circuit board, and the discrete magnetic core pieces are assembled around the inverted U-section conductive coil. The first and second discrete magnetic core pieces are operable to reach magnetic saturation at respectively different current loads applied to the coil when the circuit board is energized, imparting multiple steps of inductance rolloff response to a range of current loads.

26 Claims, 20 Drawing Sheets

HYBRID HIGH CURRENT, SURFACE MOUNT SWING INDUCTOR AND FABRICATION METHODS

BACKGROUND OF THE INVENTION

The field of the invention relates generally to surface mount electromagnetic component assemblies and methods of manufacturing the same, and more specifically to high current swing-type surface mount swing inductor components and methods of manufacturing the same.

Electromagnetic inductor components are known that utilize electric current and magnetic fields to provide a desired effect in an electrical circuit. Current flow through a conductor in the inductor component generates a magnetic field that can be concentrated in a magnetic core. The magnetic field can, in turn, store energy and release energy, cancel undesirable signal components and noise in power lines and signal lines of electrical and electronic devices, or otherwise filter a signal to provide a desired output.

Increased power density in circuit board applications has resulted in a further demand for inductor solutions to provide power supplies in reduced package sizes with desired performance. Swing-type inductor components are known that desirably operate with an inductance that varies with the current load and therefore provide performance advantages in certain application relative to other non-sing type inductor components that operate with a generally fixed or constant inductance regardless of the current load. Conventional swing-type inductor solutions, however, are disadvantaged in some aspects and improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
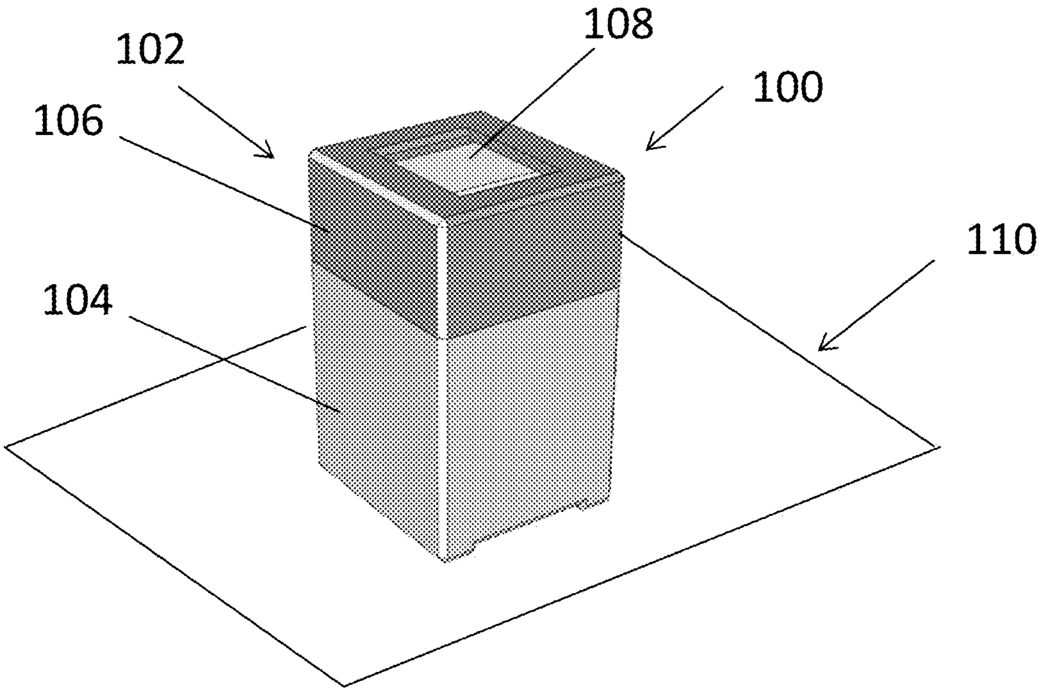
FIG. 1 is a perspective view of a first exemplary embodiment of a hybrid swing inductor in accordance with the present invention.

State of the art telecommunications and computing (datacenter, cloud, etc.) applications are requiring ever more powerful and high performance power supplies. In the case of medium and low power supplies (below 40 amps), a single-phase power supply architecture is adequate. However, with the latest processors, field programmable gate arrays (FPGAs), application specific integrated circuits (ASICs), and cloud computing systems, higher levels of power and greater performance are in demand. New power supply modules for high current computing applications such as servers and the like are therefore needed.

In order to achieve new and higher thresholds of power delivery, multiphase power supply architectures are desired. Multiphase power supplies can be designed to be much more efficient than single-phases supplies at higher power levels, and the architecture also allows for more operational flexibility. Such flexibility could also include turning off some of the phases when they aren't needed to deliver the required power, and redundancy if failures occur in certain portions of the power supply system. Multiphase power supplies, however, require much more complex design strategies. Importantly, the increased complexity falls largely on the magnetic components of the power supplies. Innovative integrated inductor design, for both non-coupled and coupled inductors, is needed to address these challenges and enable a new standard in high performance power supplies for modern use cases.

For surface mount inductor component manufacturers, the challenge has been to provide inductor components so as to minimize the area occupied on a circuit board by the inductor component (sometimes referred to as the component "footprint") and/or to minimize the component height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with a comparable size. Miniaturizing electronic components in a cost effective manner has, however, introduced a number of practical challenges to electronic component manufacturers in a highly competitive marketplace. Because of the high volume of inductor components needed for electronic devices in great demand, cost reduction in fabricating inductor components, without sacrificing performance, has been of great practical interest to electronic component manufacturers.

In general, each generation of electronic devices needs to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging as a general proposition, and especially challenging for certain applications.

Multiple phase paralleled buck converters are widely utilized in power supply applications to manage higher current applications and provide enhanced capabilities and functions. A multiphase buck converter can more efficiently handle higher power than a single-phase buck converter of equivalent power output specification, imposing new demands for integrated multi-phase non-coupled and coupled inductors for power supply converter applications in telecommunications and computing applications due to their space saving advantages on a circuit board.

In some cases, the integrated multi-phase inductor components desirably operate with low inductance and high inductance for fast load transient response, high DC bias current resistance, and high efficiency individually. With continuous inductor size reduction, it is more and more challenging to achieve both high initial inductance and high DC bias current resistance together with conventional single step inductance drop characteristics.

Swing-type inductor components are known that are self-adjustable to achieve optimal trade-off between transient performance, DC bias current resistance and efficiency in power converter applications. Unlike other types of inductor components wherein the inductance of the component is generally fixed or constant despite the current load, swing-type inductor operate with an inductance that varies with the current load. Specifically, the swing-type inductor component may include a core that can be operated almost at magnetic saturation under certain current loads. The inductance of a swing core is at its maximum for a range of relatively small currents, and the inductance changes or swings to a lower value for another range of relatively higher currents. Swing-type inductors and their multiple step inductance rolloff characteristics can avoid the limitations of other types of inductor components in power converter applications, but are difficult to economically manufacture in desired footprints while still delivering desired performance. Improvements in swing-type inductor components are accordingly desired.

Exemplary embodiments of surface mount, swing-type inductor components are described hereinbelow that may more capably perform in higher current, higher power circuitry than conventional inductor components now in use. The exemplary embodiments of integrated multi-phase inductor component assemblies are further manufacturable at relatively low cost and with simplified fabrication processes and techniques. Further miniaturization of the exemplary embodiments of integrated multi-phase inductor is also facilitated to provide surface mount inductor components with smaller package size, yet improved capabilities in high current applications.

More specifically, swing-type, surface mount inductor components are realized in an economical manner in desired package sizes with desired performance capabilities realized via strategic selection of magnetic materials utilized in discrete core pieces that are assembled around a conductive coil or coils with relative ease in vertical stack arrangement and/or horizontal side-by-side arrangements on a circuit board. Insofar as the swing-type inductors are dependent on differences in the discrete magnetic core material, the inductors of the invention are referred to herein as hybrid inductors incorporating multiple and different types of magnetic material in discrete core pieces utilized to construct the inductors. Swing-type inductance roll off characteristics may be further modified via strategically placed physical gaps in the discrete core pieces in a low cost manner with desired performance effects. Method aspects will be in part apparent and in part explicitly discussed in the description below.

Figure 2:
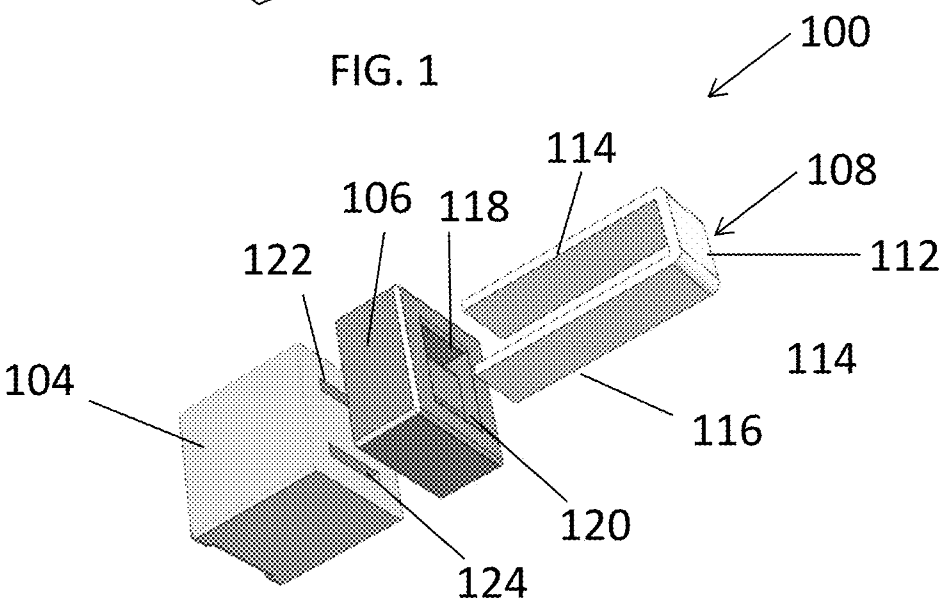
FIG. 2 is an exploded view of the hybrid swing inductor shown in FIG. 1.

FIGS. 1 and 2 illustrate a first exemplary embodiment of a hybrid swing inductor 100 in accordance with the present invention. The hybrid swing inductor 100 includes a magnetic core 102 fabricated in two discrete core pieces 104, 106 that each respectively receive and contain a portion of a conductive coil 108 that may be surface mounted to a circuit board 110. The circuit board 110 and the hybrid swing inductor 100 define a portion of power supply circuitry included in an electronic device. In a contemplated embodiment, the power supply circuitry on the circuit board 110 may implement a multiphase power supply architecture including a multiphase buck converter connected to the coil 108 of hybrid swing inductor 100 in, for example only, a high current computing application.

In a contemplated embodiment the hybrid swing inductor 100 may be connected through the circuit board 110 to one of the phases of the multiphase buck converter. Additional hybrid swing inductor components 100 may be provided as discrete components from the hybrid swing inductor 100 on the board 110 and may respectively connect to the other phases of the multiphase buck converter, with each hybrid swing inductor 100 on the circuit board 110 being independently operable from the other hybrid swing inductor components 100. As multiphase power supply architecture and multiphase buck converters are known and within the purview of those in the art, further description thereof is omitted herein. The multiphase buck converter power supply application is, however, provided for the sake of illustration rather than limitation, and other power supply applications are possible whether or not they relate to power supplies including buck converters.

In the example of FIGS. 1 and 2, the magnetic core pieces 104, 106 are vertically stacked on the circuit board 110 in the arrangement shown. The bottom of the core piece 104 is seated on the circuit board 110 and the core piece 106 is seated upon the top of the core piece 104 and extends upwardly from the core piece 104 in a spaced relation from the circuit board 110. In the illustrated example, each of the magnetic core pieces 104, 106 has about the same length and width dimensions measured in corresponding directions parallel to the plane of the circuit board 110 such that each core piece is generally square in cross-section in a plane extending parallel to the plane of the circuit board 110. The square sides of each core piece 104 and 106 are aligned with one another in the vertically stacked arrangement shown.

In the direction perpendicular to the plane of the circuit board 110 (i.e., in the vertical direction shown in FIG. 1) each of the magnetic core pieces 104 and 106 has a different height dimension. As such, in the vertical height dimension the magnetic core piece 104 is taller than the magnetic core piece 106. More specifically, the magnetic core piece 104 in the example shown is about twice as tall as the magnetic core piece 106. The overall height dimension of the entire hybrid swing inductor 100 in the completed assembly is the sum of the height dimensions of each magnetic core piece 104, 106. While specific proportions of the height dimension of the core pieces 104, 106 are shown and described, greater or lesser ratios of relative heights of the core pieces 104, 106 may be adopted in another embodiment. Likewise, while the core piece 104 in the hybrid swing inductor 100 is taller than the core piece 106, this could be reversed in another embodiment wherein the core piece 104 is smaller shorter than the core piece 106. Finally, in some embodiments the height of the core pieces 104, 106 could be about equal in yet another embodiment.

The coil 108 as shown in FIGS. 1 and 2 is an inverted U-shaped coil having a top section 112 that extends parallel to the plane of the circuit board 110 in a recessed manner on the upper side of the magnetic core piece 106 at a distance spaced from the plane of the circuit board. As such, the top section 112 of the coil 108 is spaced a vertical distance from the circuit board 110 a bit less than the overall height of the hybrid swing inductor 100. The coil 108 further includes straight and parallel leg sections 114, 116 each extending perpendicular to the top section 112 at each opposing end edge of the top section 112. The axial length of each of the leg sections 114, 116 is much greater than the axial length of the top section 112 such that the coil 108 shown is much taller than it is wide. The coil 108 may be fabricated from a sheet of conductive material having a uniform thickness that is cut and formed or bent in the particular shape having the particular features shown. The coil 108 may be provided in the shape as shown as a fully preformed element that can be simply assembled with the magnetic core pieces 104, 106 at a separate stage of manufacture without additional forming or shaping of the coil 108 being required.

The core piece 104 is formed with a pair of interior, spaced apart straight and parallel coil slots 118, 120 that are complementary in shape to but slightly larger than the legs 114 or 116 of the coil 108. In the example shown, the coil slots 118, 120 are elongated rectangular openings that accept the elongated rectangular distal ends of the legs 114 or 116. The interior core slots 118, 120 are open and accessible on the top and bottom of the core piece 104 but not from the exterior lateral sides of the core piece 104 that extend between the top and bottom of the core piece 104. For the purposes herein, the bottom of the core piece 104 seats upon the circuit board 110, the top side of the core piece 104 extends generally parallel to and spaced from the circuit board 110 in use, and the lateral sides of the core piece 104 extend perpendicular to the circuit board 110. The lateral sides of the core piece 104 define the square cross sectional shape of the core piece 104 due to their equal length and width dimensions, although this is not strictly needed in all cases and the lateral sides could alternatively define a rectangular shape in cross section instead of square by varying the relative length and width dimensions of the core piece 104.

The core piece 106 is likewise formed with a pair of interior spaced apart straight and parallel coil slots 122, 124 that are complementary in shape to but slightly larger than the legs 114 or 116 of the coil 108. In the example shown, the coil slots 122, 124 are elongated rectangular openings that accept the elongated rectangular distal ends of the legs 114 or 116. The interior core slots 122, 124 are open and accessible on the top and bottom of the core piece 106 but not from the exterior lateral sides of the core piece 106 that extend between the top and bottom of the core piece 106. For the purposes herein, the bottom of the core piece 106 seats upon the top of the core piece 104, the top side of the core piece 106 extends generally parallel to and spaced from the top of the core piece 104, and the lateral sides of the core piece 106 extend perpendicular to the top and bottom sides. The lateral sides of the core piece 106 define the square cross sectional shape of the core piece 106 due to their equal length and width dimensions, although this is not strictly needed in all cases and the lateral sides could alternatively define a rectangular shape in cross section instead of square by varying the relative length and width dimensions of the core piece 106.

The coil slots 118, 120, 122, 124 in the magnetic core pieces 104, 106 extend entirely through the core pieces 104, 106 and are oriented to extend perpendicularly to the plane of the circuit board 110 in each magnetic core piece 104, 106. The coil slots 118, 120, 122, 124 therefore extend vertically inside the core pieces 104, 106 in the view of FIG. 1. As seen in FIG. 1, the bottom of the core piece 106 is slightly recessed to provide a clearance from the surface of the circuit board 110 where the distal ends of the coil legs 114, 116 meet the circuit board 110 to complete the desired surface mount electrical connections to the circuit board 110.

In the assembly of the hybrid swing inductor 100, the core piece 106 sits upon and above the core piece 104, and the coil slots 118, 120 are aligned with the coil slots 122, 124 such that the vertical legs 114, 116 of the coil 108 may be inserted into and passed through the respective coil slots 118, 120, 122, 124. Specifically, the distal end of the leg 114 of coil 108 passes through the coil slot 118 in the magnetic core piece 106 and also through the coil slot 122 in the magnetic core piece 104, while the leg 116 of coil 108 passes through the coil slot 120 in the magnetic core piece 106 and through the coil slot 124 in the magnetic core piece 106 until the top section 112 is seated upon the magnetic core piece 106 and the distal ends of the leg sections 114, 116 protrude slightly from the bottom surface of the magnetic core piece 104 for surface mounting to the circuit board 110. In the completed assembly, part of the vertical leg 114 extends in and fully occupies the interior slot 122 of the core piece 104 while part of the vertical leg 114 extends in and fully occupies the interior slot 118 of the core piece 106, part of the vertical leg 116 extends in and fully occupies the interior slot 124 of the core piece 104 while part of the vertical leg 116 extends in and fully occupies the interior slot 120 of the core piece 106, while the top section 112 of the coil 108 resides only on the core piece 106 and is generally open and exposed on the exterior of the core piece 106.

The first magnetic core piece and the second magnetic core piece 104, 106 are advantageously fabricated from respectively different magnetic materials having different magnetic properties to achieve desired swing-type inductor characteristics in the inductor 100. Specifically, each core piece 104 and 106, because of the different magnetic materials utilized in each, will reach magnetic saturation at different current levels in the use and operation of the inductor 100. As used herein, magnetic saturation refers to the state or condition in each magnetic core piece 104 and 106 when an increase in applied external magnetic field H (generated by current flowing through the coil 108) cannot increase the magnetization of the material any further than it already is. The different magnetic saturation in each core piece 104, 106 will in turn desirably realize multiple steps of inductance rolloff characteristics in the operation of the swing-type inductor 100.

The magnetic materials used to fabricate each respective core piece 104, 106 may be selected from a variety of soft magnetic particle materials known in the art and formed into the illustrated shapes according to known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, Mn—Zn power ferrite materials, Mn—Zn high permeability ferrite core materials, and other suitable materials known in the art. In some cases, magnetic powder particles may be coated with an insulating material such the magnetic core pieces may possess so-called distributed gap properties familiar to those in the art and fabricated in a known manner.

The different magnetic materials utilized to fabricate each core piece 104 and 106 may be strategically selected to have a different permeability to one another, a different saturation flux density from one another, different temperature characteristics, different frequency characteristics, etc. for optimal swing-type inductor functionality for specific end use or applications. In contemplated embodiments for multiple phase paralleled buck converters the magnetic permeability of each magnetic material may range for example from about 10 to about 15000, and the saturation flux density may range for example from about 0.2 Tesla to about 2 Tesla.

The discrete magnetic core pieces 104 and 106 may be separately manufactured and provided as pre-formed elements for assembly with the coil 108. Batch processing is made possible via preformed and prefabricated modular elements for assembly into hybrid swing inductors 100 in a reduced amount of time and at lower cost with respect to certain conventional swing-type inductor components offering comparable functionality but requiring a more difficult assembly. Each of the core pieces 104 and 106 are simply shaped and may therefore be provided at lower cost with simpler assembly than conventional swing-type inductors having more complicated shapes.

Figure 3:
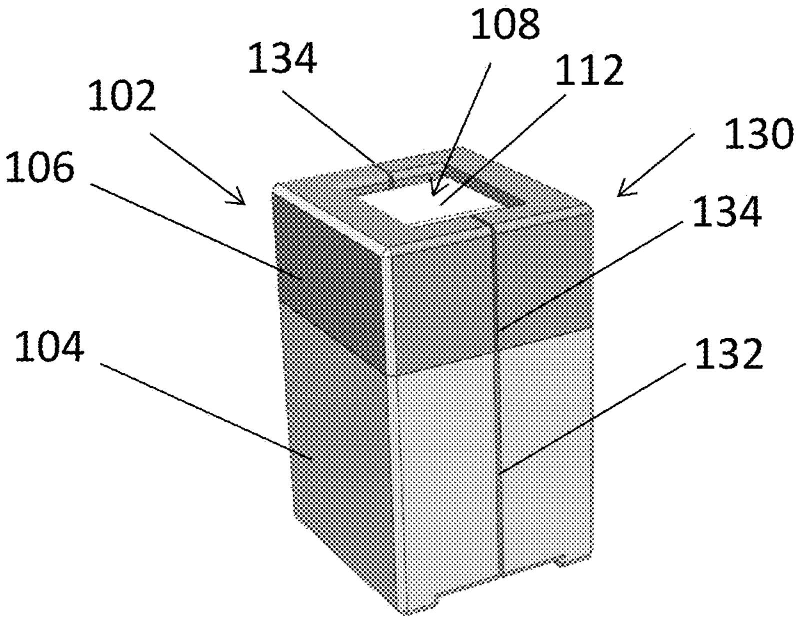
FIG. 3 is a perspective view of a second exemplary embodiment of a hybrid swing inductor in accordance with the present invention.

FIG. 3 is a perspective view of a second exemplary embodiment of a hybrid swing inductor 130 in accordance with the present invention that may likewise be surface mounted to the circuit board 110 (FIG. 1) in addition to or in lieu of the hybrid swing inductor 100 (FIGS. 1 and 2). The hybrid swing inductor 130 is similar to the hybrid swing inductor 100 but includes a centrally located physical gap 132 formed into the lateral side of the core piece 104 and a centrally located physical gap 134 formed into the lateral side of the core piece 106. The physical gaps 132, 134 are centered on the respective lateral sides of the core pieces 104, 106 and vertically aligned with one another so that they extend co-linearly in the vertical direction in the vertically stacked core pieces 104, 106. The physical gap 134 also extends in part horizontally toward the top section 112 of the coil 108 on the top of the core piece 104. The physical gap 132 also includes a horizontal extension running on the bottom surface of the core piece 104. The physical gaps 132, 134 are formed with a consistent and uniform width and depth in the vertical and horizontal extensions on each magnetic core piece 104, 106.

A second set of physical gaps similar to the gaps 132, 134 is formed in each core piece 104, 106 on the opposite lateral side of core pieces 104, 106 and extends in the same manner. The physical gaps 132, 134 change the swing-type response characteristics of the hybrid swing inductor 130 relative to the hybrid swing inductor 100 in a desirable manner for certain end uses and applications such as the multiphase paralleled buck converter power supply application. The physical gaps 132, 134 in the hybrid swing inductor 130 are simply formed and easy to manufacture at an economical cost with some additional performance benefits. Otherwise, the benefits of the hybrid swing inductor 130 and the hybrid swing inductor 100 are similar.

It is contemplated that in further embodiments one of the physical gaps 132, 134 may be provided without the other in the magnetic core pieces 104, 106 to obtain still further swing-type functionality and effect relative to the hybrid swing inductor 130. Also, while specific types and locations of physical gaps are shown and described, other locations and orientations of physical gaps are possible and may be adopted. Generally speaking, a physical gap can be located anywhere in the respective core pieces 104, 106 where it crosses the flux line in the section of the core piece where it is located and have a desirable effect in the hybrid swing inductor.

Likewise, while the physical gaps 132, 134 in the core pieces 104, 106 are about the same width and depth in each core piece 104, 106 the width or depth could be made different in each of the gaps to provide still further variance in performance characteristics. Also, while in the hybrid swing inductor 130 pairs of gaps 132 and 134 are provided in each respective lateral side of the core piece 104, 106 such that each magnetic core piece 104 and 106 includes two gaps in a symmetrical arrangement, the gap number and gap location in each magnetic core piece 104, 106 need neither be same nor need they be symmetrical.

Figure 4:
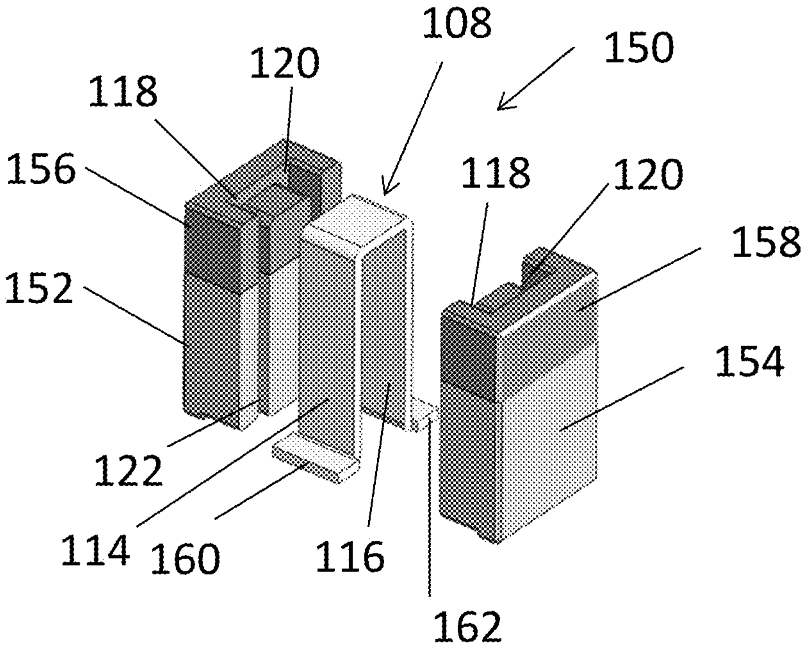
FIG. 4 is a first exploded view of a third exemplary embodiment of a hybrid swing inductor in accordance with the present invention.
Figure 5:
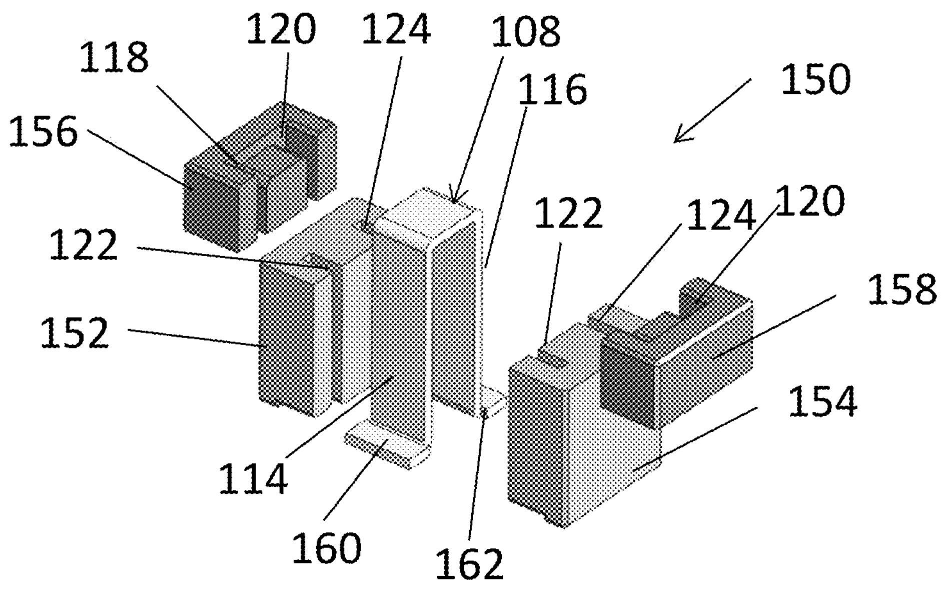
FIG. 5 is a second exploded view of the hybrid swing inductor shown in FIG. 4.

FIGS. 4 and 5 are exploded views of a third exemplary embodiment of a hybrid swing inductor 150 in accordance with the present invention that may likewise be surface mounted to the circuit board 110 (FIG. 1) in addition to or in lieu of the hybrid swing inductor 100 (FIGS. 1 and 2). Unlike the hybrid swing inductor 100 and 130 described above that each include two discrete magnetic core pieces, the hybrid swing inductor 150 includes four magnetic pieces.

Specifically, the hybrid swing inductor 150 includes a pair of lower magnetic core pieces 152 and 154 that each define ½ of the core piece 104 in the hybrid swing inductor 100, and a pair of upper core pieces 156 and 158 that each define ½ of the core piece 106 in the hybrid swing inductor 100. As such, each of the core pieces 152, 154 includes ½ of each of the core slots 122, 124 and each of the core pieces 156, 158 includes ½ of each of the core slots 118, 120. Therefore portions of the coil slots 118, 120, 122, 124 are now exposed on exterior lateral sides of the core pieces 152, 154, 156 and 158. The lower pair of magnetic core pieces 152, 154 are taller than the upper pair of magnetic core pieces 156, 158 that is vertically stacked on top of the lower pair of core pieces 152, 154. The pairs of discrete magnetic core pieces 152, 154, 156 and 158 are easily assembled to and around the coil 108, or vice-versa, with a sliding assembly to inter-fit with the side edges of the coil 108 and core pieces 152, 154, 156 and 158.

In the assembly of the hybrid swing inductor 150, the core pieces 156, 158 sit upon and above the core pieces 152, 154. The coil slots 118, 120 in the core piece 156 are aligned with the coil slots 122, 124 in the core piece 152, such that ½ of the coil vertical legs 114, 116 of the coil 108 extend in the respective coil slots 118, 120 and ½ of the coil vertical legs 114, 116 extend in the coil slots 122, 124 in the core pieces 152, 156. Likewise, the coil slots 118, 120 in the core piece 158 are aligned with the coil slots 122, 124 in the core piece 154, such that ½ of the coil vertical legs 114, 116 of the coil 108 extend in the respective coil slots 118, 120, 122, 124 in the core pieces 154, 158. Unlike the inductor 100 wherein the coil legs 114, 116 fully occupy the aligned core slots in the magnetic core pieces, in the inductor 150 the coil legs 114, 116 partly occupy multiple coil slots in different ones of the discrete magnetic core pieces.

In the completed assembly of the hybrid swing inductor 150 different portions of the coil legs 114, 116 extend in all four of the magnetic core pieces 152, 154, 156 and 158. The lower portion of the coil vertical leg 114 partly extends in the slot 122 of the core piece 152 partly extends in the slot 122 of the core piece 154 while the upper portion of the vertical leg 116 partly extends in the aligned slot 118 of the core piece 156 on one side of the coil 108, and the lower portion of the coil vertical leg 114 also partly extends in the slot 118 of the core piece 154 while the upper portion of the vertical leg 114 partly extends in the aligned slot 118 of the core piece 156 on the opposing side of the coil 108. Likewise, the lower portion of the coil vertical leg 116 partly extends in the slot 122 of the core piece 152, partly extends in the slot 124 of the core piece 152 and the upper portion of the coil leg 116 partly extends in the slot 118 of the core piece 156 on one side of the coil 108, while the lower portion of the coil leg 116 partly extends in the slot 120 of the core piece 154 and the upper part of the coil leg 116 extends partly in the slot 120 of the core piece 158 on the other side of the coil 108. The coil top section 112, however, is seated ½ upon the magnetic core piece 156 and the ½ upon the magnetic core piece 158. As such, while the coil legs 114, 116 are partly received in all four magnetic core pieces 152, 154, 156, 158 the coil top section 112 is received in only the two magnetic core pieces 156, 158.

The distal ends of the leg sections 114, 116 protrude slightly from the bottom of the magnetic core pieces 152 and 154 for surface mounting to the circuit board 110, and the lower ends of the coil leg sections 114, 116 each includes a planar surface mount terminal pad 160, 162. The terminal pads 160, 162 extend perpendicularly to the coil legs 114, 116 and also extend away from each other in opposite directions from the coil legs 114, 116 in the example shown. The terminal pads 160, 162 provide a larger surface area to complete the surface mount connections to the circuit board 110 than the smaller surface area of the distal ends of the legs 114, 116 only as in the example of the hybrid swing inductor 100.

Advantageously, the discrete magnetic core pieces 152, 154, 156 and 158 can be fabricated from different magnetic materials such as those described above to realize desirable swing-type inductor characteristics. Specifically, the core pieces 152, 154, 156 and 158 because of the different magnetic materials utilized, will reach magnetic saturation at different current levels in the use and operation of the hybrid swing inductor 100. In contemplated embodiments the core pieces 152, 154 may each be fabricated from one and the same first type of magnetic material, while the core pieces 156, 158 may be each be fabricated from one and the same second type of magnetic material having different properties from the first such that the pair of core pieces 152, 154 reach saturation together and the core pieces 156, 158 reach saturation together at respectively different current loads.

The hybrid swing inductor 150 is a bit more difficult to assemble than the hybrid swing inductor 100 because of the additional core pieces, but the benefits of the hybrid swing inductor 100 and 150 are otherwise similar.

Figure 6:
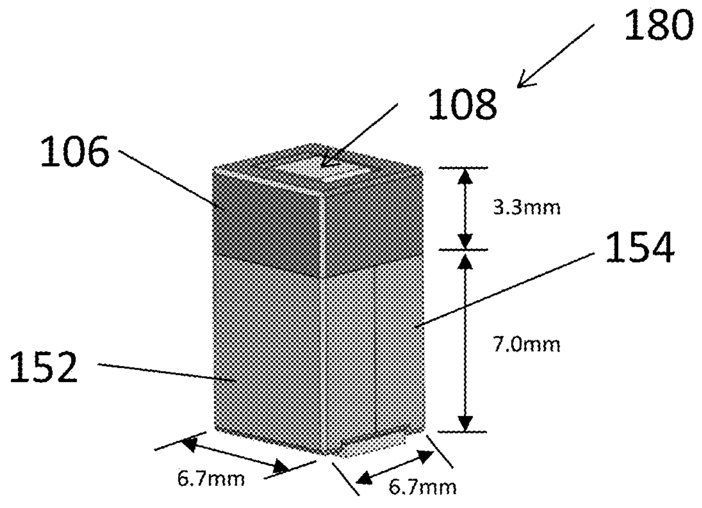
FIG. 6 is a perspective view of a fourth exemplary embodiment of a hybrid swing inductor in accordance with the present invention.
Figure 7:
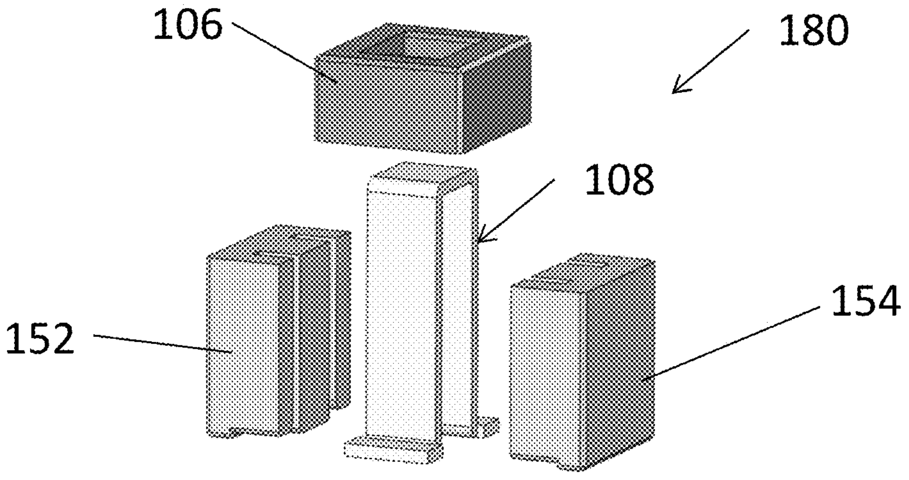
FIG. 7 is an exploded view of the hybrid swing inductor shown in FIG. 5.

FIGS. 6 and 7 illustrate a fourth exemplary embodiment of a hybrid swing inductor 180 in accordance with the present invention that may likewise be surface mounted to the circuit board 110 (FIG. 1) in addition to or in lieu of the hybrid swing inductor 100 (FIGS. 1 and 2). Unlike the hybrid swing inductor 100 and 130 described above that each include two discrete magnetic core pieces, and unlike the hybrid swing inductor 150 that includes four discrete magnetic core pieces, the hybrid swing inductor 180 includes three discrete magnetic core pieces.

Specifically, the hybrid swing inductor 180 includes the core piece 106 (also shown in FIGS. 1 and 2) atop the core pieces 152, 154 (also shown in FIGS. 4 and 5) that are assembled to and around the coil 108. In the assembly of the hybrid swing inductor 180, ½ of the lower sections of each coil leg 114, 116 is extended in the coil slots in the core pieces 152, 154 while the entire upper section of each coil leg 114, 116 extends only in the respective coil slots in the core piece 106. The hybrid swing inductor 180 has a package size of about 6.7 mm by 6.7 mm in the length and width dimension, and a height dimension of about 10.3 mm (7.0 mm of which is in the magnetic pieces 152, 154 and 3.3 mm of which is in the magnetic core piece 306). The hybrid swing inductors 100, 130, 150 can be provided in similar package sizes to the hybrid swing inductor 180 with desired performance that is difficult to meet in conventional swing-type inductor constructions of a similar package size.

The three core pieces 152, 154, 106 in the hybrid swing inductor 180 may be advantageously be fabricated from different magnetic materials such as those described above to realize desirable swing-type inductor characteristics. Specifically, the core pieces 152, 154, 106 because of the different magnetic materials utilized, will reach magnetic saturation at different current levels in the use and operation of the hybrid swing inductor 180. In contemplated embodiments the core pieces 152, 154 may each be fabricated from one and the same first type magnetic material, while the core piece 106 is fabricated from another and different second type of magnetic material having different properties from the first. In other embodiments, however, the core pieces 152, 154 may also be fabricated from respectively different magnetic materials providing different saturation points to provide desired variations in swing, type characteristics. As such, two or three different types of magnetic materials may be utilized to fabricate the core pieces 152, 154, 106 in the manufacture of the hybrid swing inductor 180.

The hybrid swing inductor 180 entails a slightly more difficult assembly than the hybrid swing inductors 100 or 130 but slightly less difficulty that the hybrid swing inductor 150. The benefits of the hybrid swing inductor 180 are otherwise similar.

Figure 8:
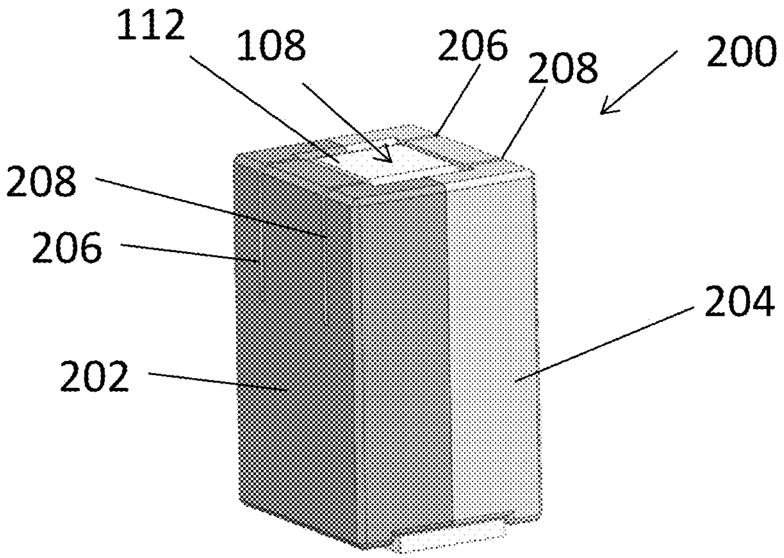
FIG. 8 is a perspective view of a fifth exemplary embodiment of a hybrid swing inductor in accordance with the present invention.
Figure 9:
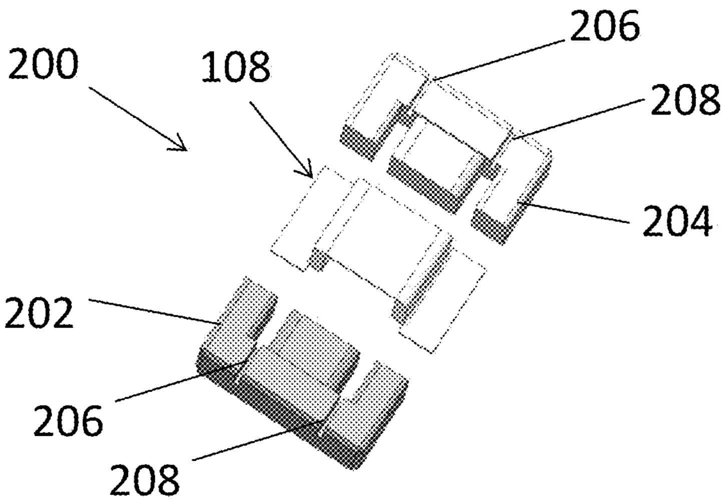
FIG. 9 is an exploded view of the hybrid swing inductor shown in FIG. 8.

FIGS. 8 and 9 illustrate a fifth exemplary embodiment of a hybrid swing inductor 200 in accordance with the present invention that may likewise be surface mounted to the circuit board 110 (FIG. 1) in addition to or in lieu of the hybrid swing inductor 100 (FIGS. 1 and 2). Unlike the hybrid swing inductor 100 including vertically stacked magnetic core pieces having a different height dimension, the hybrid swing inductor 200 includes two magnetic core pieces 202, 204 of equal height arranged side-by-side with the coil 108 therebetween. As such, and relative to the hybrid swing inductor 150, the upper core pieces 156, 158 are omitted in favor of taller core pieces 202, 204 that accommodate the full height of the coil legs 114, 116. Therefore, in the assembly of the hybrid swing inductor 200, ½ of the coil legs 114, 116 and ½ of the coil top section 112 extends in and on each core piece 202, 204.

The core pieces 202, 204 in the hybrid swing inductor 200 are advantageously fabricated from respectively different magnetic materials such as those described above to realize desirable swing-type inductor characteristics. Specifically, the core pieces 202, 204, because of the different magnetic materials utilized, will reach magnetic saturation at different current levels in the use and operation of the inductor 200. In contemplated embodiments the core piece 202 may be fabricated from a first type magnetic material, while the core piece 204 is fabricated from another and different second type of magnetic material having different properties from the first such that they reach different saturation points in use.

The magnetic core pieces 202, 204 are also each formed with optional physical gaps 206 and 208 that extend vertically and horizontally on the surfaces of the magnetic core pieces 202, 204 to further enhance the swing-type characteristics of the hybrid swing inductor 200. The physical gaps 206 and 208 extend in spaced apart relation from one another, and in the vertical direction extend for a distance much less than the height dimension of the core pieces 202, 204, while in the horizontal direction at the surface of the core pieces 202, 204 the physical gaps 206 and 208 extend to the top section 112 of the coil 108.

The hybrid swing inductor 200 including the two magnetic core pieces 202, 204 arranged side-by-side requires a different assembly than the hybrid swing inductor 100, but otherwise provides similar benefits.

Figure 10:
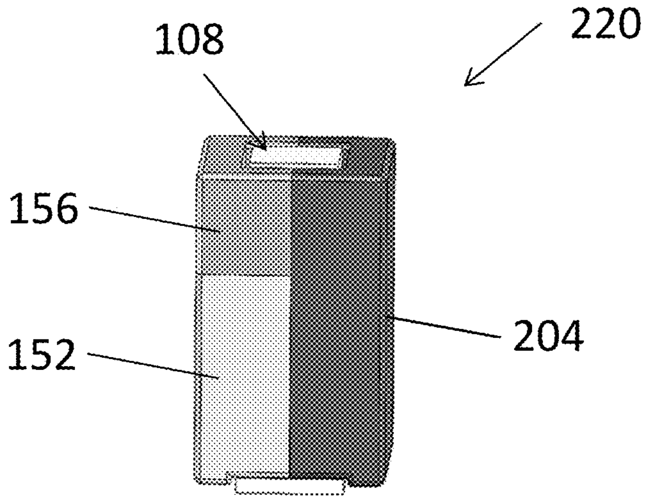
FIG. 10 is a perspective view of a sixth exemplary embodiment of a hybrid swing inductor in accordance with the present invention.
Figure 11:
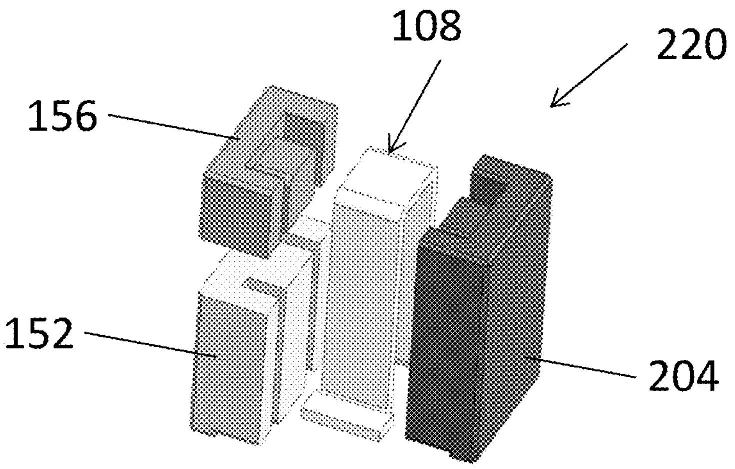
FIG. 11 is an exploded view of the hybrid swing inductor shown in FIG. 10.

FIGS. 10 and 11 illustrate a sixth exemplary embodiment of a hybrid swing inductor 220 in accordance with the present invention that may likewise be surface mounted to the circuit board 110 (FIG. 1) in addition to or in lieu of the hybrid swing inductor 100 (FIGS. 1 and 2). Unlike the hybrid swing inductor 100 and 130 described above that each include two magnetic core pieces, and like the hybrid swing inductor 180 the hybrid swing inductor 220 includes three discrete magnetic pieces arranged about the coil 108.

Specifically, the hybrid swing inductor 220 includes the tall magnetic core piece 204 on one side of the coil 108, and the shorter core piece 152 with the core piece 156 vertically stacked atop the core piece 152 on the other side of the coil 108. The coil vertical legs 114, 116 are extended in the coil slots of the core pieces 204, 152 and 156. The core pieces 202, 204 in the hybrid swing inductor 220 are advantageously fabricated from respectively different magnetic materials such as those described above to realize desirable swing-type inductor characteristics. Specifically, the core pieces 204, 152, 156, because of the different magnetic materials utilized, will respectively reach magnetic saturation at different current levels in the use and operation of the hybrid swing inductor 220. In contemplated embodiments the core pieces 204 may be fabricated from a first type magnetic material, while the core piece 152 is fabricated from another and different second type of magnetic material having different properties from the first, and while the core piece 156 is fabricated from another and different third type of magnetic material having different properties from the first and second.

The hybrid swing inductor 220 having core pieces 204, 152, 156 of different magnetic material realize still further and different swing-type functionality than the hybrid swing inductor 100 having two pieces or the hybrid swing inductor 180 that also includes three pieces. The benefits of the hybrid swing inductor 220 are otherwise similar.

Figure 12:
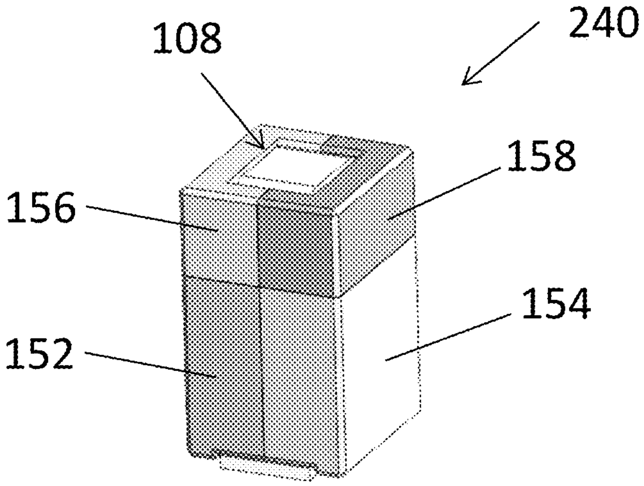
FIG. 12 is a perspective view of a seventh exemplary embodiment of a hybrid swing inductor in accordance with the present invention.

FIG. 12 is a perspective view of a seventh exemplary embodiment of a hybrid swing inductor 240 in accordance with the present invention that may likewise be surface mounted to the circuit board 110 (FIG. 1) in addition to or in lieu of the hybrid swing inductor 100 (FIGS. 1 and 2). The hybrid swing inductor 240 includes the magnetic core pieces 152, 154, 156 and 158 like the hybrid swing inductor 150 (FIGS. 4 and 5). In the hybrid swing inductor 240, the core pieces 152, 154, 156 and 158 may each be fabricated from respectively different magnetic materials providing different saturation points to provide desired variations in swing-type characteristics in use and operation of the hybrid swing inductor 150. As such four different types of magnetic materials are utilized to fabricate the different core pieces 152, 154, 156 and 158 in the hybrid swing inductor 240.

Figure 13:
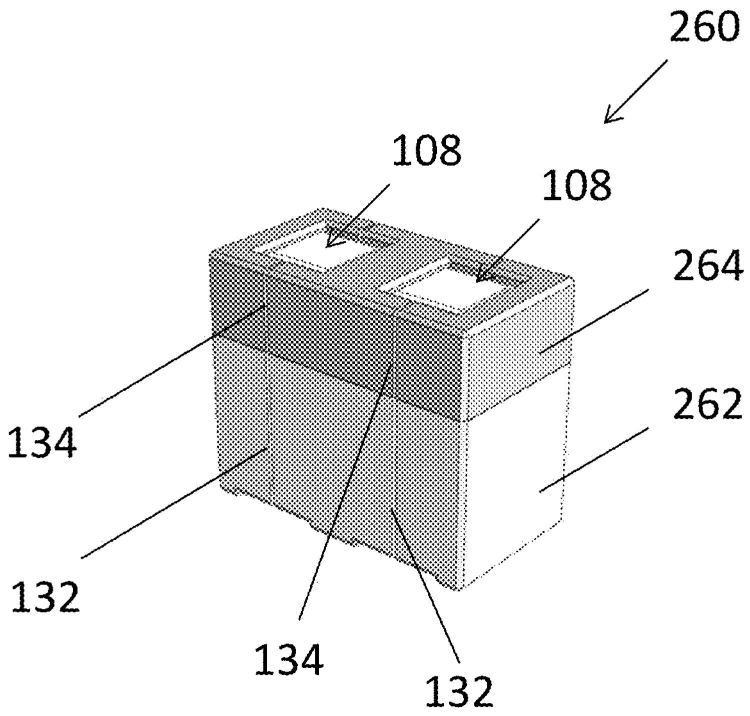
FIG. 13 is a perspective view of an eighth exemplary embodiment of a hybrid swing inductor in accordance with the present invention.
Figure 14:
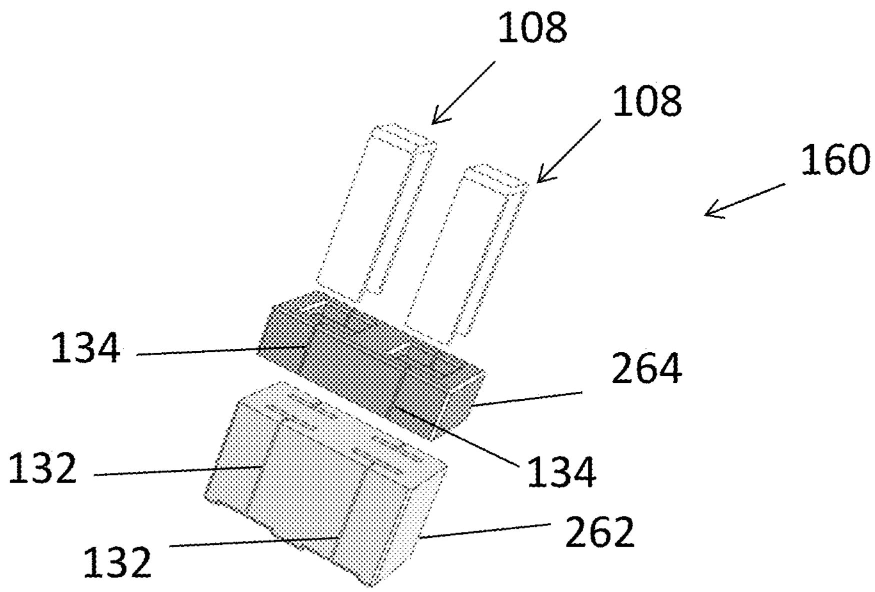
FIG. 14 is an exploded view of the hybrid swing inductor shown in FIG. 13.

FIGS. 13 and 14 illustrate an eighth exemplary embodiment of a hybrid swing inductor 260 in accordance with the present invention that may likewise be surface mounted to the circuit board 110 (FIG. 1) in addition to or in lieu of the hybrid swing inductor 100 (FIGS. 1 and 2).

The hybrid swing inductor 260 is similar to the inductor 130 (FIG. 3) but with discrete magnetic core pieces 262, 264 that are vertically stacked with each core piece 262, 264 configured to receive a pair of coils 108 via elongated coil pieces 162, 164 provided with dual sets of coil slots 118, 120 and 122, 124 as shown. Optional pairs of physical gaps 132, 134 are provided with one pair centered on the axis of each coil 108. The core pieces 262, 264 are respectively fabricated from different magnetic materials to reach saturation at respectively different points in the use and operation of the inductor 260 and therefore realize desired swing-type inductor functionality. The concept further is scalable to include any number n of coils 108 via further elongation of the core pieces 262, 264 and additional sets of coil slots. The inductor 260 having more than one coil 108 assembled to a common core structure advantageously may provide space savings on the circuit board 110 relative to two discrete inductor components that include separate magnetic core structures and that are separately mounted to the circuit board 110. The coils 108 in the inductor 260 may be magnetically coupled or non-coupled inside the magnetic core pieces 262, 264.

Figure 15:
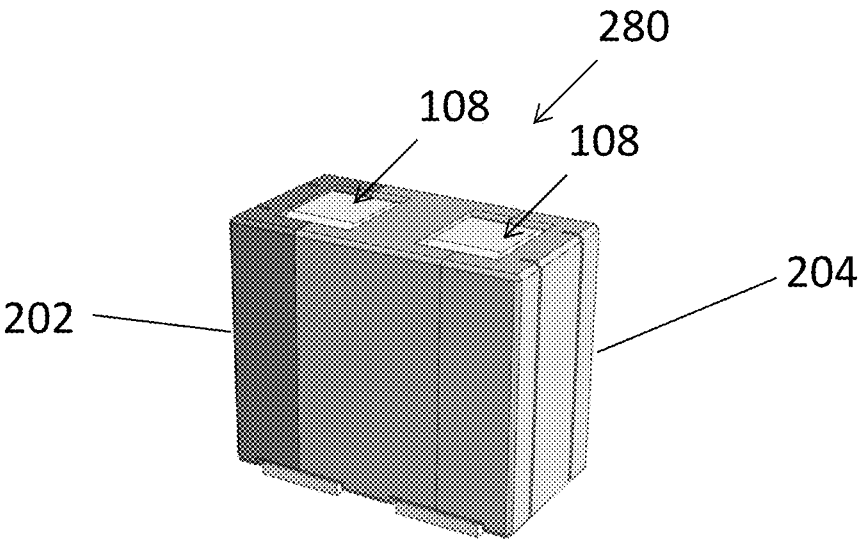
FIG. 15 is a perspective view of an ninth exemplary embodiment of a hybrid swing inductor in accordance with the present invention.
Figure 16:
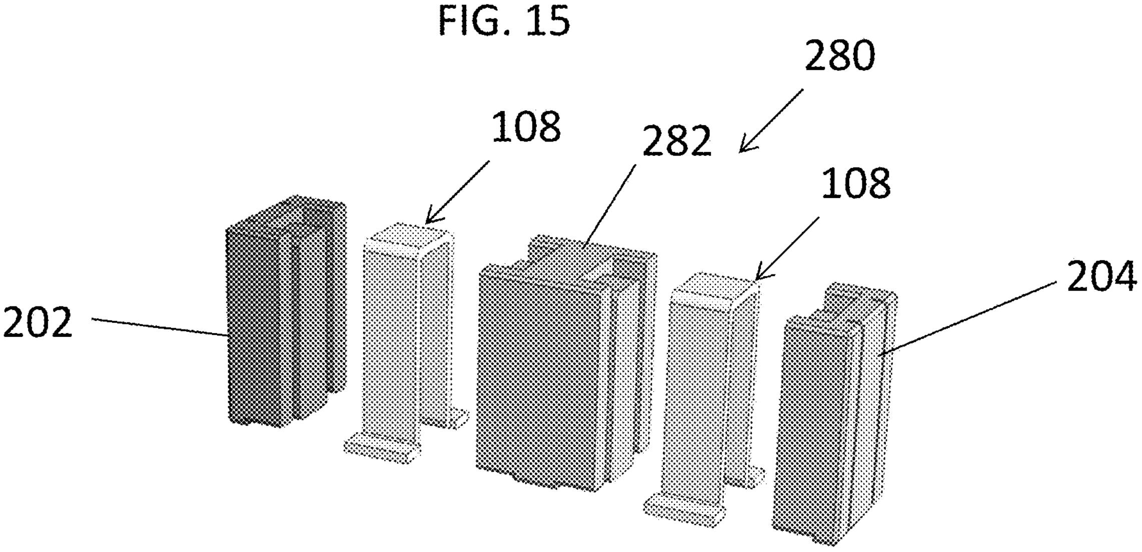
FIG. 16 is an exploded view of the hybrid swing inductor shown in FIG. 15.

FIGS. 15 and 16 illustrate a ninth exemplary embodiment of a hybrid swing inductor 280 in accordance with the present invention that may likewise be surface mounted to the circuit board 110 (FIG. 1) in addition to or in lieu of the hybrid swing inductor 100 (FIGS. 1 and 2). The hybrid swing inductor 280 is an adaptation of the inductor 200 to include a pair of coils 108 instead of only one. The hybrid swing inductor 280 accordingly includes the core pieces 202, 204 with third core piece having oppositely facing sets of coil slots. The coils 108 are respectively fitted to extend partly in the coil slots of the respective magnetic core pieces 202, 204, 282. The core pieces 202, 204, 282 are respectively fabricated from different magnetic materials to reach saturation at respectively different points in the use and operation of the inductor 280 and therefore realize desired swing-type inductor functionality. The concept further is scalable to include any number n of coils 108 via additional core pieces 282 to accommodate additional coils between the core pieces 202 and 204.

Figure 17:
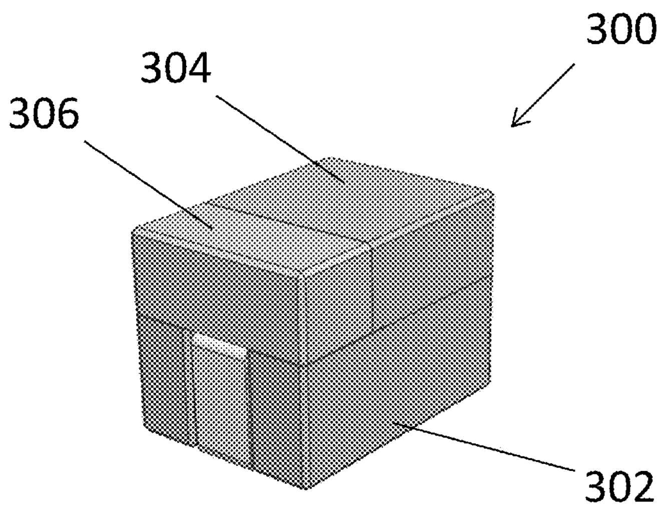
FIG. 17 is a perspective view of a tenth exemplary embodiment of a hybrid swing inductor in accordance with the present invention.
Figure 18:
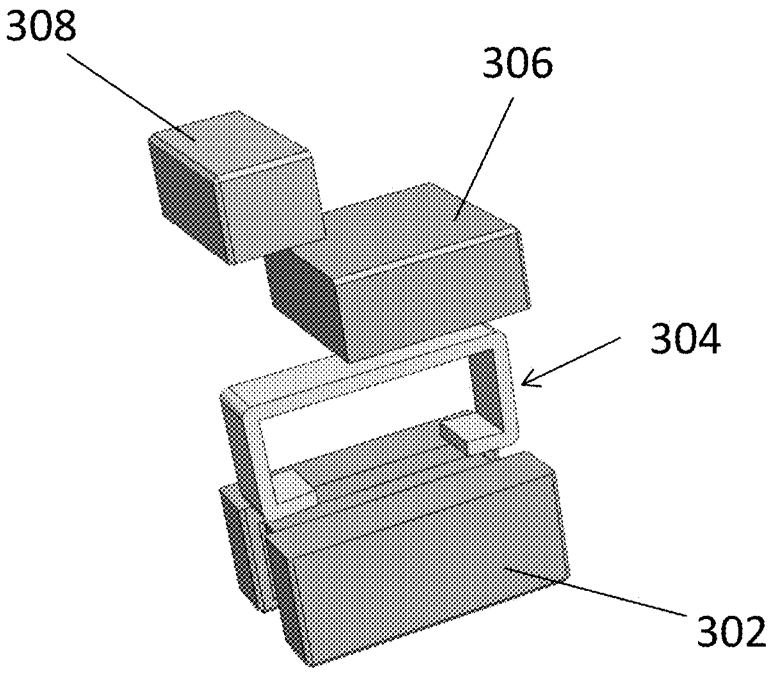
FIG. 18 is an exploded view of the hybrid swing inductor shown in FIG. 17.

FIGS. 17 and 18 illustrate a tenth exemplary embodiment of a hybrid swing inductor 300 in accordance with the present invention that may likewise be surface mounted to the circuit board 110 (FIG. 1) in addition to or in lieu of the hybrid swing inductor 100 (FIGS. 1 and 2). The inductor 300 includes a larger lower magnetic core piece 302 including an integrated coil slot to receive a coil 304 thereon, and smaller magnetic core pieces 306 and 308 stacked vertically on the top of the magnetic core piece 302 but side-by-side to one another. The magnetic core pieces 306, 308 have the same width as the core piece 302 but different height and length than the core piece 302. The magnetic core pieces 306, 308 have different length to one another, with the core piece 306 being about twice as long as the core piece 308.

The core piece 308 is advantageously fabricated from a different magnetic material than the core pieces 302, 306 to reach saturation at respectively different points in the use and operation of the inductor 300 and therefore realize desired swing-type inductor functionality.

The coil 304, like the coil 108 described above, is an inverted U-shaped coil including a top section that extends parallel to the plane of the circuit board 110 and straight and parallel leg sections each extending perpendicular to the top section at each opposing end edge of the top section. The leg sections of the coil 304 are relatively short and the top section is relatively long compared to the coil 108, such that the coil 308 is not as tall as the coil 108. Surface mount termination pads are also shown at the lower ends of the coil leg sections in the coil 304, which extend coplanar to one another and extend inwardly to one another on the bottom of the core piece 302. The core pieces 302, 306, 308 and coil 304 are simply shaped and easy to provide in an economical manner with relative simple assembly. The core pieces 306, 308 need not be formed with a coil slot or other features to receive any portion of the coil 304, although in further embodiments the core pieces 306, 308 could include such features.

Figure 19:
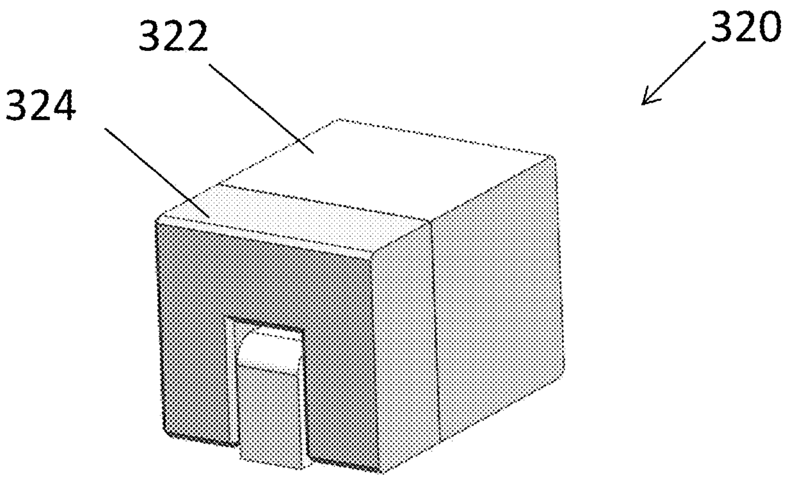
FIG. 19 is a perspective view of an eleventh exemplary embodiment of a hybrid swing inductor in accordance with the present invention.
Figure 20:
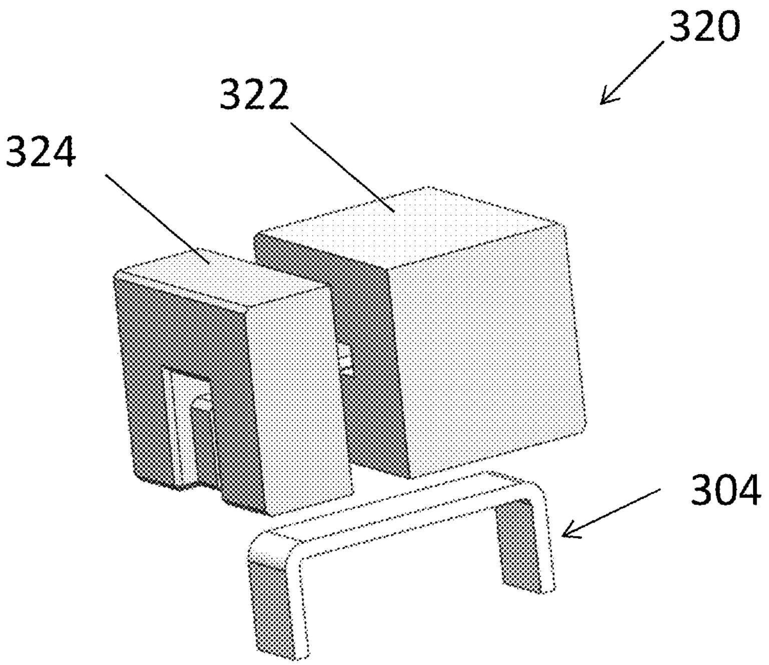
FIG. 20 is a first exploded view of the hybrid swing inductor shown in FIG. 19.
Figure 21:
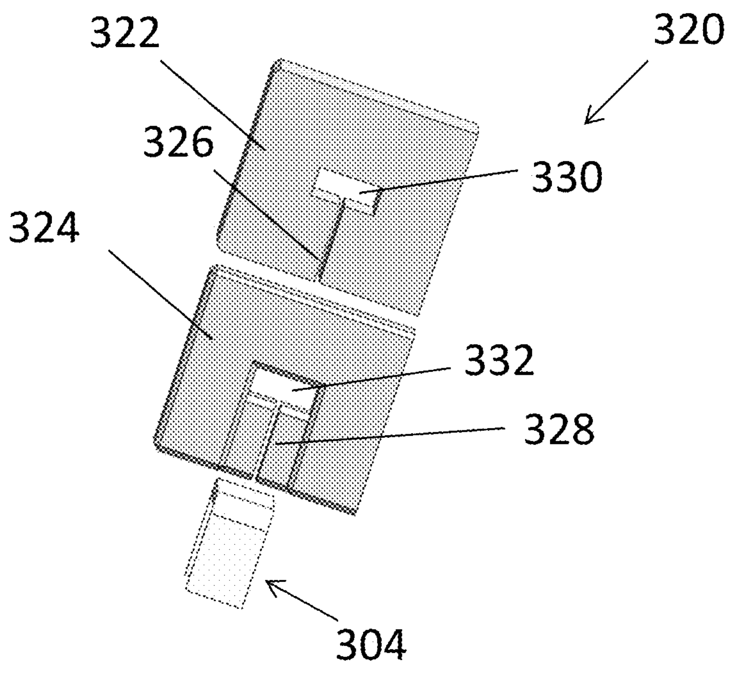
FIG. 21 is a second exploded view of the hybrid swing inductor shown in FIG. 19.

FIGS. 19-21 illustrate an eleventh exemplary embodiment of a hybrid swing inductor 320 in accordance with the present invention in accordance with the present invention that may likewise be surface mounted to the circuit board 110 (FIG. 1) in addition to or in lieu of the hybrid swing inductor 100 (FIGS. 1 and 2).

Instead of vertically stacked core pieces in the inductor 300, the inductor 320 includes two discrete magnetic core pieces 322, 324 arranged side-by-side and defining horizontally extending coil slots for the top section of the coil 304. Also, in the example shown in FIGS. 19 and 20 the coil 304 does not include the surface mount termination pads shown in FIG. 18 at the bottom of the vertical leg sections. The magnetic core pieces 322, 324 have an equal width dimension and an equal height dimension, but different length dimensions. The core piece 322 is about twice as long as the core piece 324 in the example shown, although greater or lesser difference in length could likewise be adopted. In another embodiment the core piece 322 and 324 could have an equal length as well.

Optional physical gaps 326, 328 are also formed in the magnetic core pieces 322, 324 and in the example shown the gaps 326, 328 are centered in each core piece and extend vertically from the bottom of each core piece to intersect the horizontal coil slot 330, 332 formed in each core piece 322, 324 that align with one another in the assembly to receive the top section of the coil 304. The core pieces 322, 324 are relatively simply shaped and realize a simple assembly, but require the coil 304 to be shaped after it is initial assembly with the core pieces 322, 324 to extend the leg sections of the coil at the ends of each magnetic core piece 304. The leg sections of the coil 304 also extend in recesses formed in the ends of the magnetic core pieces 322, 324 and are therefore generally flush with the ends of the magnetic core pieces 302, 304.

The core piece 322 is advantageously fabricated from a different magnetic material than the core piece 324 to reach saturation at respectively different points in the use and operation of the inductor 300 and therefore realize desired swing-type inductor functionality in an economical manner.

Figure 22:
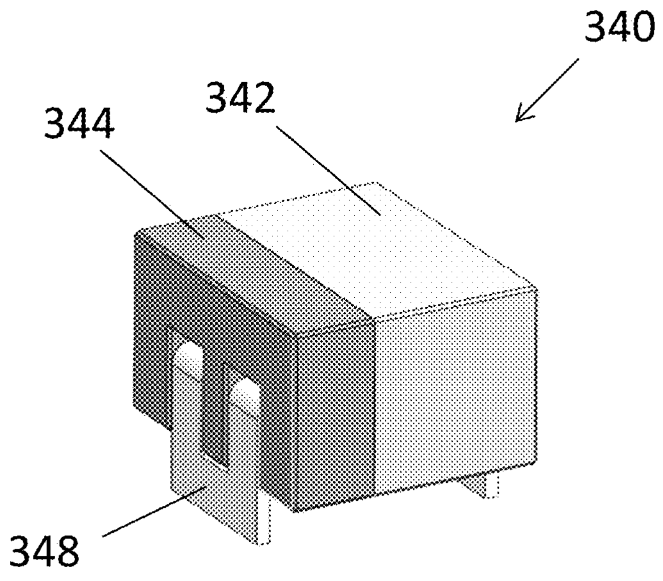
FIG. 22 is a perspective view of a twelfth exemplary embodiment of a hybrid swing inductor in accordance with the present invention.
Figure 23:
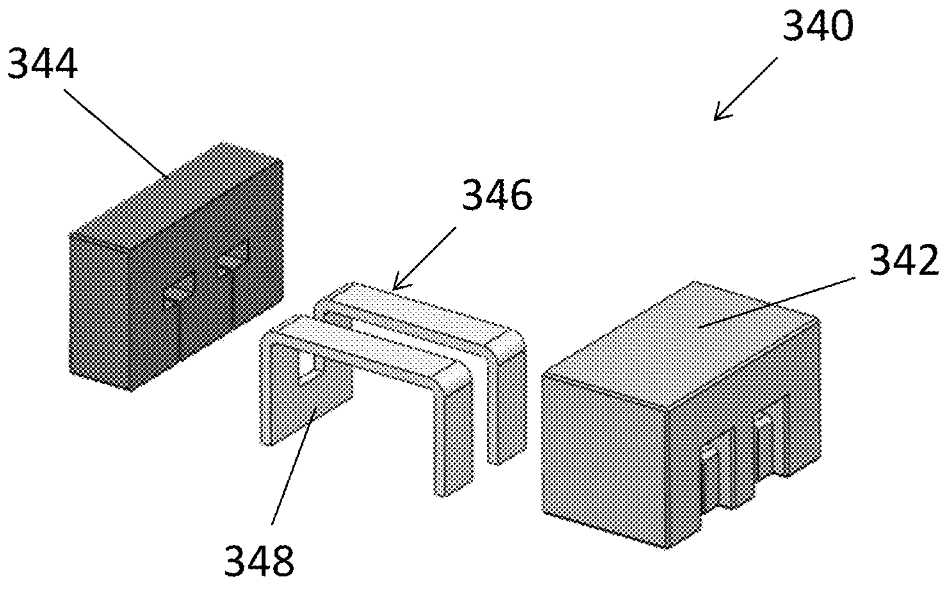
FIG. 23 is an exploded view of the hybrid swing inductor shown in FIG. 22.

FIGS. 22 and 23 illustrate a twelfth exemplary embodiment of a hybrid swing inductor 340 in accordance with the present invention that may likewise be surface mounted to the circuit board 110 (FIG. 1) in addition to or in lieu of the hybrid swing inductor 100 (FIGS. 1 and 2). The hybrid swing inductor 340 is an adaptation of the inductor 320 to include two horizontal coil slots apiece in elongated core pieces 342, 344. The core pieces 342, 344 are respectively fabricated from different magnetic materials to reach saturation at respectively different points in the use and operation of the inductor 340 and therefore realize desired swing-type inductor functionality.

The inductor 340 further includes a coil 346 with two inverted U-sections that extend in a spaced apart relationship as shown in FIG. 23, with the vertical leg sections on one side joined to one another via a perpendicular section 348 spanning the distance between the vertical legs. On the opposing side of the coil 346, the vertical leg sections of the inverted U-sections are not joined to one another. As such, the coil 346 may beneficially provide a paralleled output on the side including the section 348 from distinct inputs connection to the vertical leg sections on the side opposite the section 348. The concept further is scalable to include any number n of coils 346 via further elongation of the core pieces 342, 344 to accommodate additional coils 346.

The hybrid swing inductor 340 provides additional benefits to the inductors described above with a low cost paralleled output feature.

Figure 24:
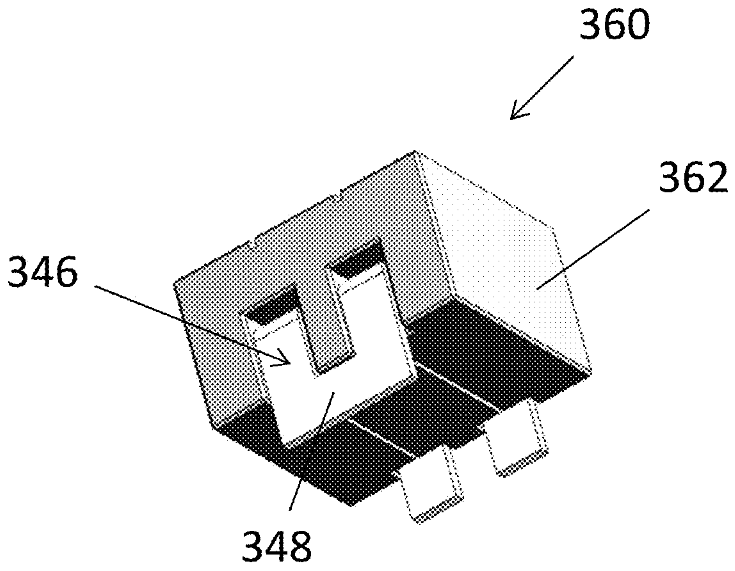
FIG. 24 is a perspective view of a thirteenth exemplary embodiment of a hybrid swing inductor in accordance with the present invention.
Figure 25:
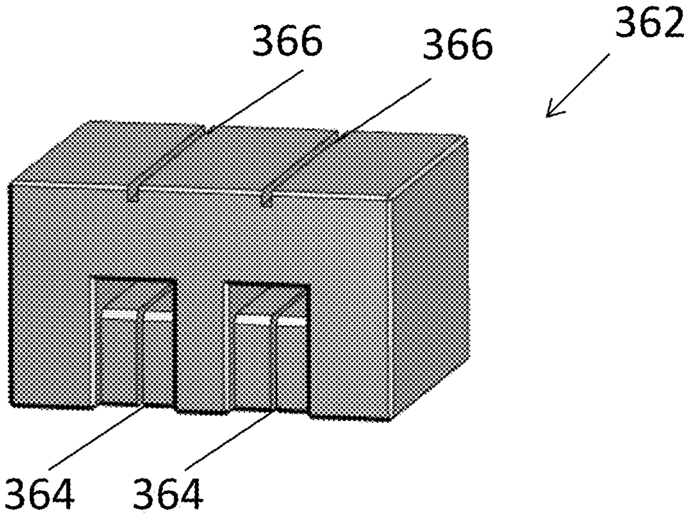
FIG. 25 is a perspective view of a core piece for the hybrid swing inductor shown in FIG. 24.

FIGS. 24 and 25 illustrate a thirteenth exemplary embodiment of a hybrid swing inductor 360 in accordance with the present invention that may likewise be surface mounted to the circuit board 110 (FIG. 1) in addition to or in lieu of the hybrid swing inductor 100 (FIGS. 1 and 2). The inductor 360 includes the coil 346 with the perpendicular section 348 to provide the paralleled output feature in a single piece magnetic core 362. Physical gaps 364 and 366 are formed in the core 362 above and below each coil slot as shown in FIG. 25 that impart advantageous swing inductor functionality even though there is only one core piece in the inductor 360. The gaps 366 are centered on each coil slot and extend across the top of the core piece 362 and therefore extend horizontally across the width of the core piece 362 on the top surface, while the gaps 364 are aligned with the gaps 366 but extend below the coil slots. The gaps 366 are relatively shallow whereas the gaps 364 are relatively deep. The assembly of the inductor 360 is therefore simplified since there is only one core piece 362 and may the inductor 360 be provided at lower cost since only magnetic material is needed.

Figure 26:
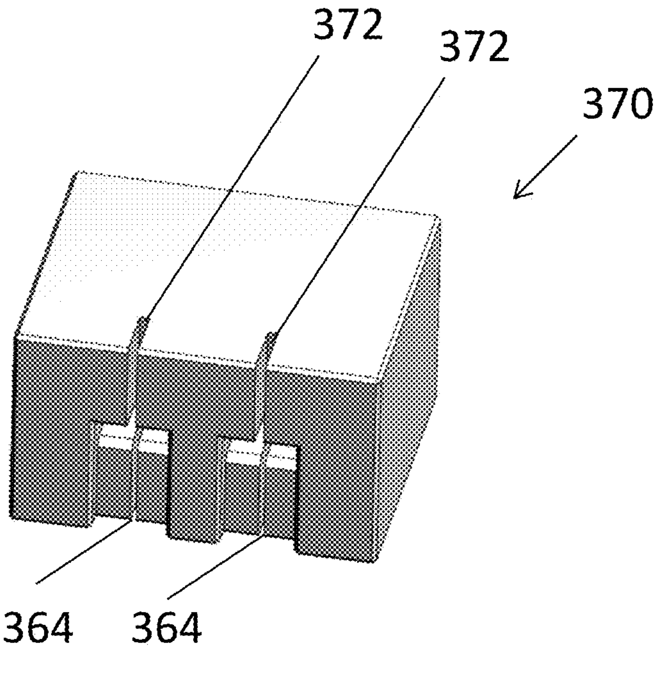
FIG. 26 is a perspective view of a first alternative core piece for the hybrid swing inductor shown in FIG. 24.

FIG. 26 is a perspective view of an alternative core piece 370 for the hybrid swing inductor 360. The core piece 370 includes the physical gaps 364 extending below the coil slots with vertically extending physical gaps 372 extending above the coil slots. The gaps 364, 372 are respectively aligned with one another. The core piece 370 may be assembled with the coil 346 to impart advantageous swing inductor functionality even though there is only one core piece in the inductor, and with paralleled output capability.

Figure 27:
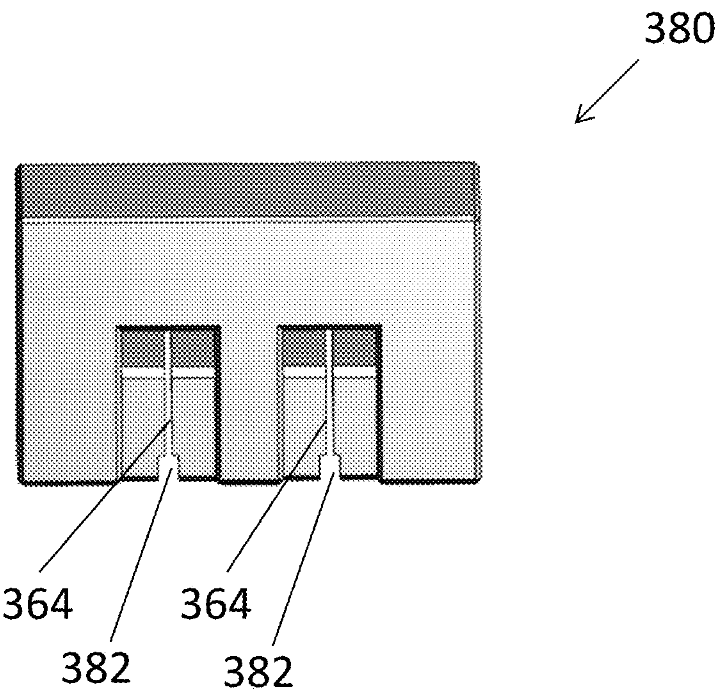
FIG. 27 is a perspective view of a second alternative core piece for the hybrid swing inductor shown in FIG. 24.
Figure 28:
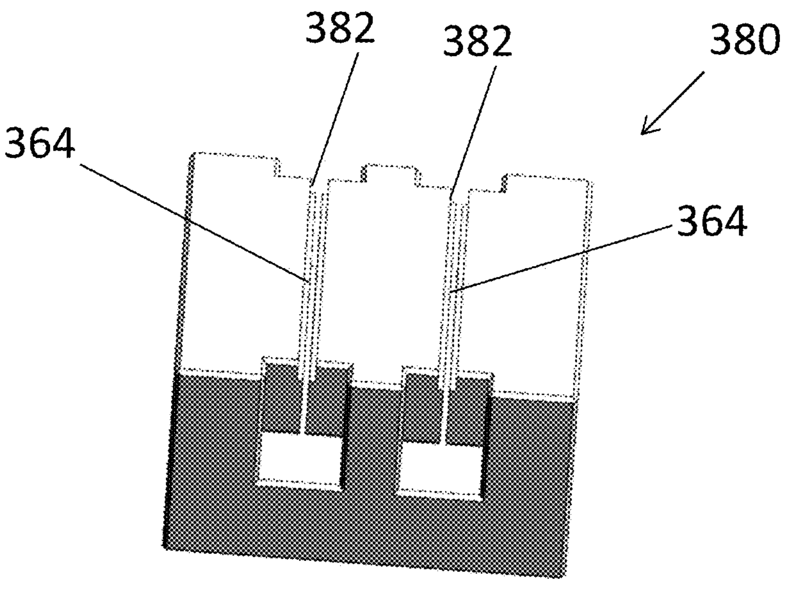
FIG. 28 is a perspective view of the second alternative core piece for shown in FIG. 27.

FIGS. 27 and 28 illustrate another alternative core piece 380 for the hybrid swing inductor 360. The core piece 380 includes the physical gaps 364 having a first width extending below the coil slots, and aligned gaps 382 of a second width adjacent to the bottom of the core piece 380. The core piece 380 may be assembled with the coil 346 to impart advantageous swing inductor functionality even though there is only one core piece in the inductor, and with paralleled output capability.

Figure 29:
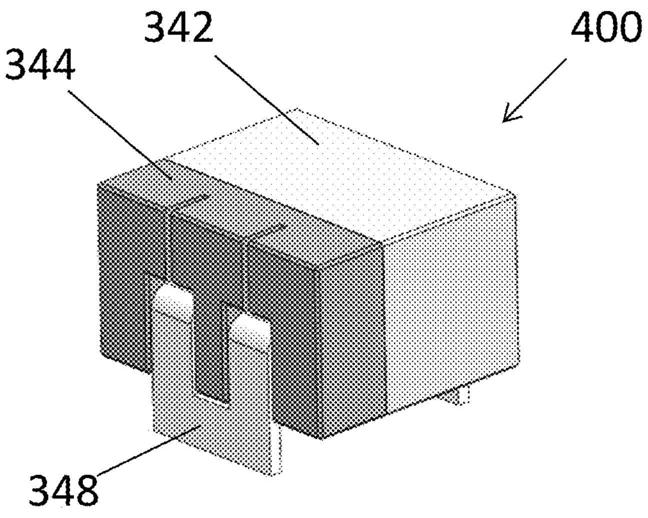
FIG. 29 is a perspective view of a fourteenth exemplary embodiment of a hybrid swing inductor in accordance with the present invention.
Figure 30:
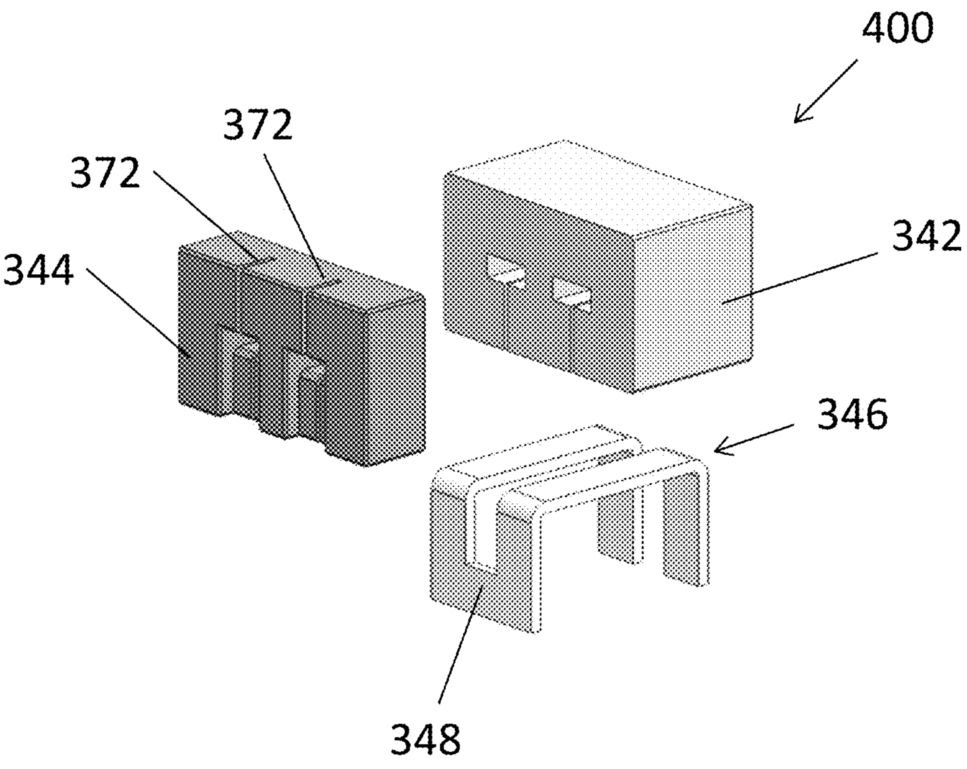
FIG. 30 is an exploded view of the hybrid swing inductor shown in FIG. 29.

FIGS. 29 and 30 illustrate a fourteenth exemplary embodiment of a hybrid swing inductor 400 in accordance with the present invention that may likewise be surface mounted to the circuit board 110 (FIG. 1) in addition to or in lieu of the hybrid swing inductor 100 (FIGS. 1 and 2). The inductor 400 is similar to the inductor 340 (FIGS. 22 and 23) but includes physical gaps 372 in the core piece 344 extending vertically above the coil slots. The physical gaps 372, in combination with the different magnetic materials of the core pieces 342, 344, provide economical swing inductor functionality with ease of assembly.

Figure 31:
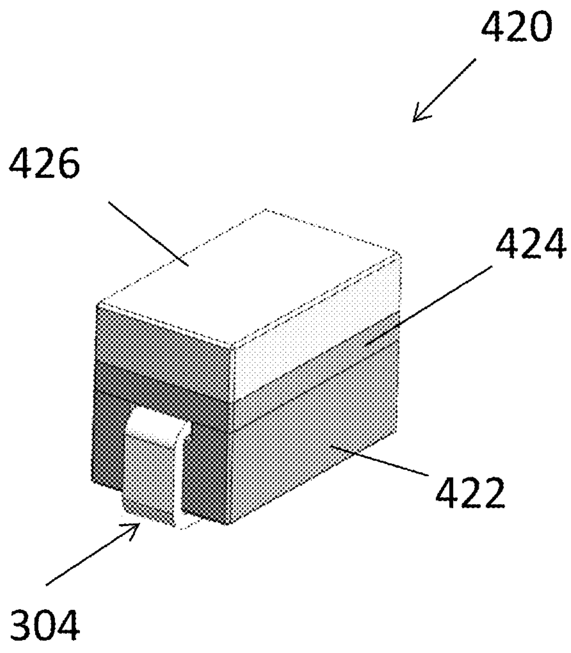
FIG. 31 is a first perspective view of a fifteenth exemplary embodiment of a hybrid swing inductor in accordance with the present invention.
Figure 32:
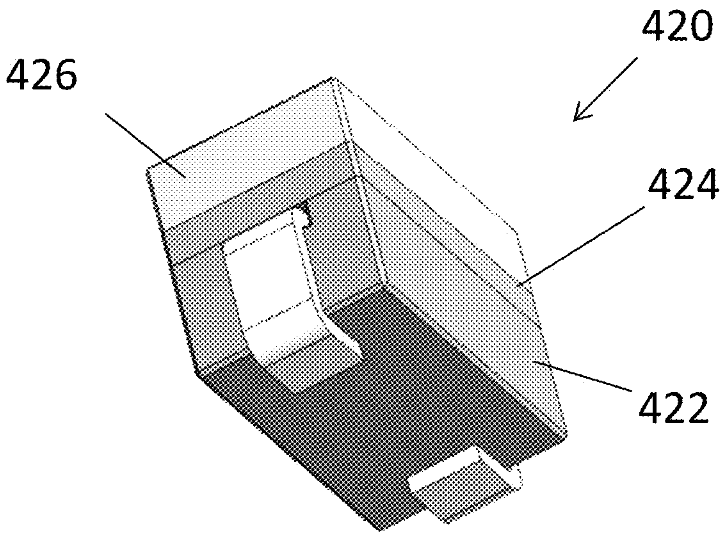
FIG. 32 is a second perspective view of the hybrid swing inductor shown in FIG. 30.
Figure 33:
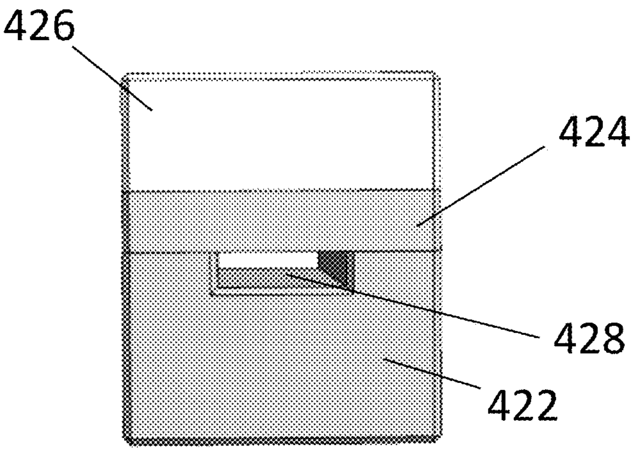
FIG. 33 is an elevational view of the magnetic core for the hybrid swing inductor shown in FIGS. 31 and 32.

FIGS. 31-33 illustrate a fifteenth exemplary embodiment of a hybrid swing inductor 420 in accordance with the present invention that may likewise be surface mounted to the circuit board 110 (FIG. 1) in addition to or in lieu of the hybrid swing inductor 100 (FIGS. 1 and 2). The inductor 420 includes vertically stacked discrete magnetic core pieces 422, 424, 426 each having a similar length and width but each having a respectively different height. The top section of the coil 304 is fitted in a horizontal coil slot 428 on the core piece 422, while the core pieces 424, 426 overlie the coil 304 and the core piece 422. The vertical leg sections of the coil 304 wrap around the ends of the core piece 422 and the surface mount termination pads further wrap around the bottom of the core piece 422 for surface mounting to the circuit board 110.

The core pieces 422, 424, 426 are respectively fabricated from different magnetic materials to produce desired swing-type functionality in an economical manner with simply shaped core pieces 422, 424, 426 and a simple shaped coil 304. Additional core pieces can be added to provide further vertically stacked layers of magnetic material with strategically placed magnetic material to produce optimal swing-type inductor functionality for the end application.

Figure 34:
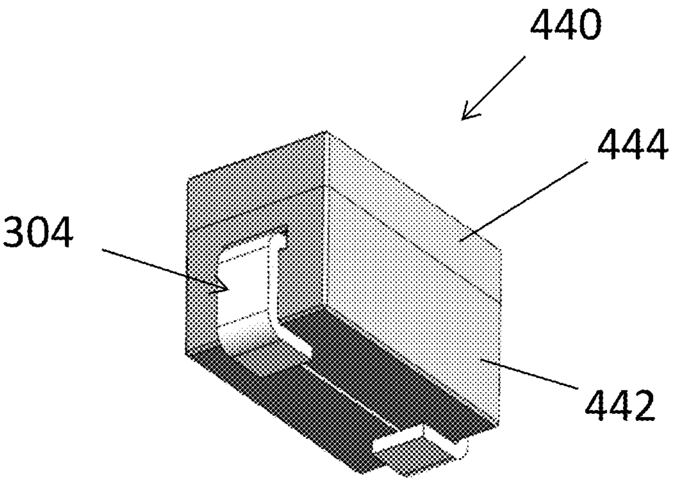
FIG. 34 is a first perspective view of a sixteenth exemplary embodiment of a hybrid swing inductor in accordance with the present invention.
Figure 35:
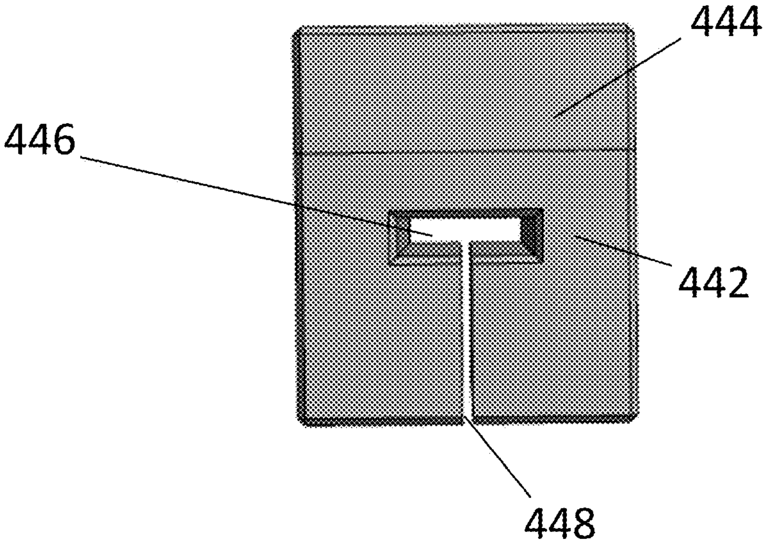
FIG. 35 is a second perspective view of the hybrid swing inductor shown in FIG. 34.

FIGS. 34 and 35 illustrate a sixteenth exemplary embodiment of a hybrid swing inductor 440 in accordance with the present invention that may likewise be surface mounted to the circuit board 110 (FIG. 1) in addition to or in lieu of the hybrid swing inductor 100 (FIGS. 1 and 2). The inductor 440 includes two vertically stacked discrete pieces 442, 444 and the coil 304. The core piece 442 includes a horizontal coil slot 446 and a vertical physical gap extending below the slot 446. The physical gap 448 in combination with the magnetic materials utilized to fabricate the core pieces 442, 444 imparts swing-type functionality with simple shaped pieces and a simple shaped coil with ease of assembly.

Figure 36:
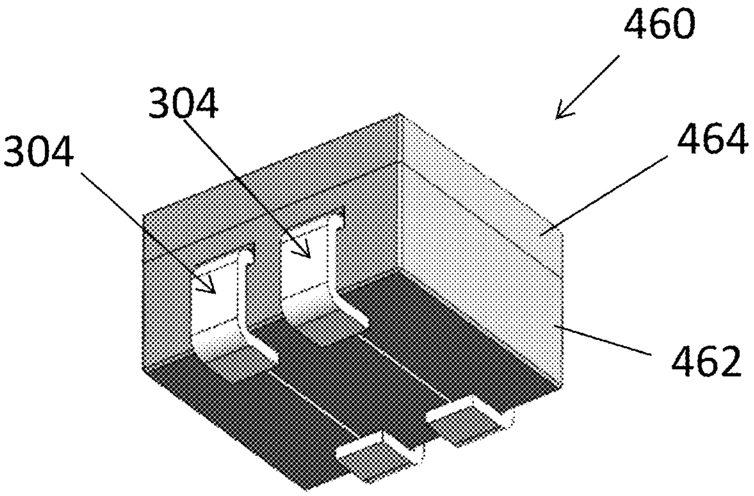
FIG. 36 is a first perspective view of a seventeenth exemplary embodiment of a hybrid swing inductor in accordance with the present invention.
Figure 37:
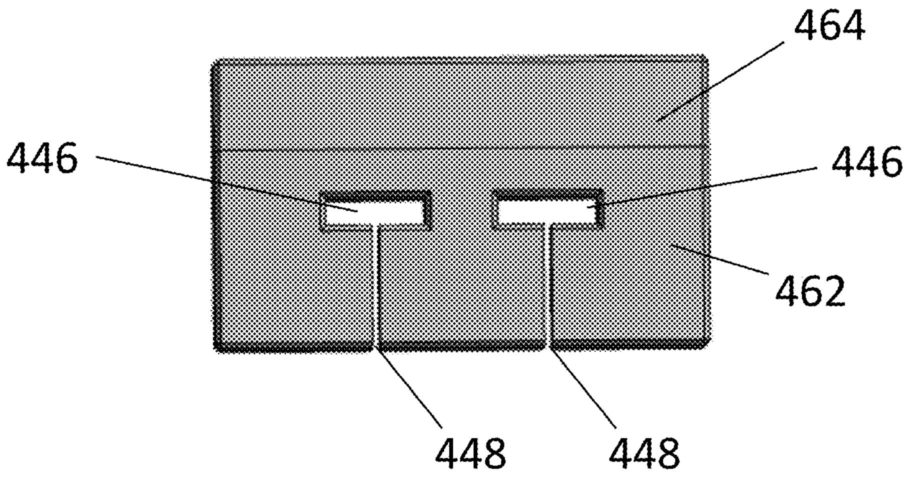
FIG. 37 is an end elevational view of the magnetic core for the hybrid swing inductor component shown in FIG. 36.

FIG. 36 an 37 illustrate a seventeenth exemplary embodiment of a hybrid swing inductor 460 in accordance with the present invention that may likewise be surface mounted to the circuit board 110 (FIG. 1) in addition to or in lieu of the hybrid swing inductor 100 (FIGS. 1 and 2). The inductor 460 is similar to the hybrid swing inductor 440 but includes elongated core pieces 462, 464 to accommodate first and second coils 304 in the inductor 460 via first and second coil slots 446 each with vertical physical gaps 448 extending underneath. The concept is scalable to include any number n of coils via additional elongation of the core pieces to provide additional coil slots. The physical gaps 448 in combination with the magnetic materials utilized to fabricate the core pieces 462, 464 imparts swing-type functionality with simple shaped pieces and a simple shaped coil with ease of assembly.

Figure 38:
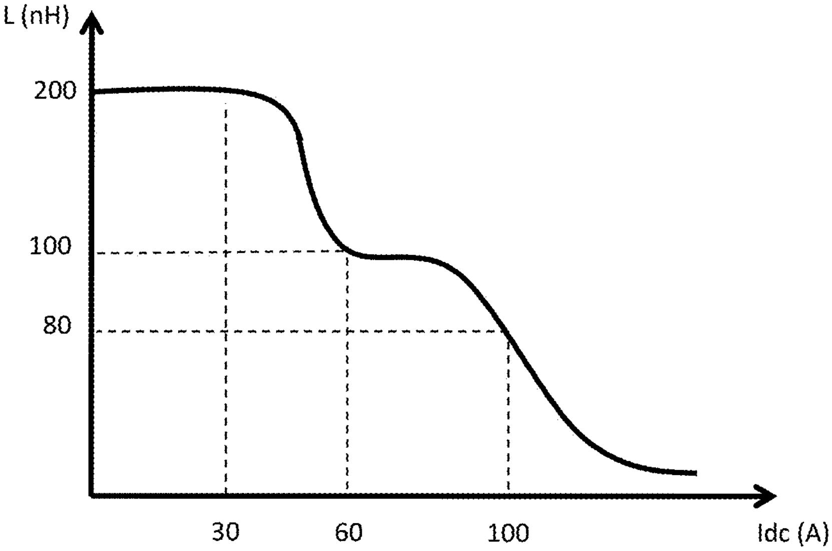
FIG. 38 is an exemplary graphical illustration of steps of inductance rolloff characteristics of swing inductor components according to the present invention.

FIG. 38 is an exemplary graphical illustration of steps of inductance rolloff characteristics of swing inductors according to the present invention such as those described above, and FIG. 39 is an exemplary graphical illustration of inductance rolloff characteristics of conventional non-swing type inductor components for comparison.

Figure 39:
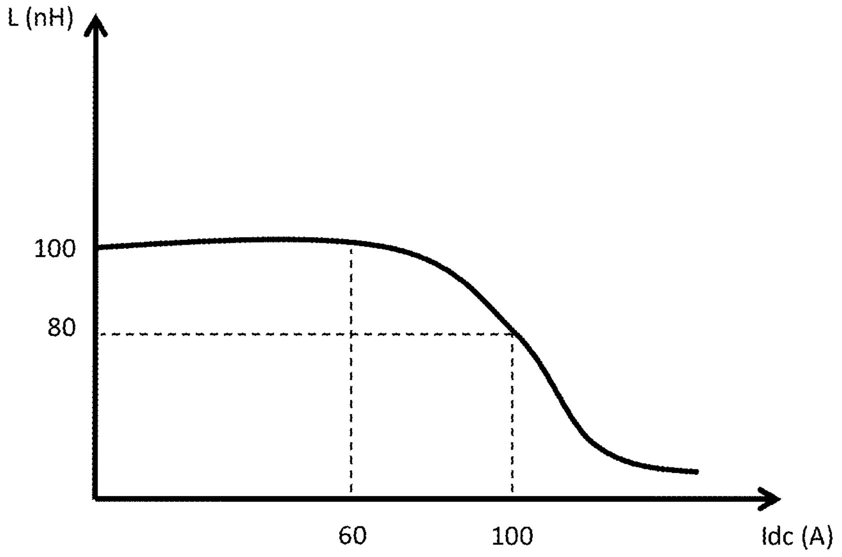
FIG. 39 is an exemplary graphical illustration of inductance rolloff characteristics of conventional non-swing type inductor components.

The inductance characteristics are shown in FIGS. 38 and 39 in the form of inductance plots wherein inductance values correspond to the vertical axis and wherein current values correspond to the horizontal axis. As seen in the inductance plots, the conventional non-swing type inductor exhibits a fixed and generally constant inductance value indicated by the horizontal line at the left-hand side of FIG. 39 that represents a constant open circuit inductance (OCL) value over a normal operating range of current values. The open circuit inductance (OCL) value is the same regardless of the actual current load in use within the normal operating range of the inductor. As such, when the inductor is operated at a current up to its saturation current ($I_{sat}$) that represents a full load inductance (FLL) or full load operation, the inductor exhibits a fixed and generally constant inductance value corresponding to a full load inductance (FLL) value regardless of the actual current load.

In contrast, and as can be seen in the plot in FIG. 38 for the "swing" inductor, the swing inductor has an inductance that varies with the current load, and specifically can be operated almost at magnetic saturation under certain current loads, while changing or swinging to a lower value for another range of relatively higher currents. As such, the "swing" inductor exhibits multiple steps of inductance rolloff characteristics while the "regular" conductor does not. The non-swing inductor as shown in FIG. 39 operates with a single step rolloff characteristic. The multiple step rolloff characteristics of the swing inductor as shown in FIG. 38 provides substantial performance benefits for certain power converter applications relative to a regular inductor (i.e., a non-swing-type inductor). Specifically, the swing inductor may operate with high inductance at a range of light (i.e., lower) current loads until eventually becoming saturated via the different magnetic materials utilized and/or via the physical gaps provided in the embodiments described above until the OCL drops and realizes a higher DC bias resistance for a range of heavy (i.e. higher) current loads, while returning back to the high inductance when the current load returns back to rang of light current load.

The various swing inductor components described above offer a considerably variety of swing-type inductor functionality in an economical manner while using a small number of component parts that are manufacturable to provide small inductor at relatively low cost with superior performance advantages. Particularly in the case of high power density electrical power system applications such as the multi-phase power supply circuits and power converters for computer servers, computer workstations and telecommunication equipment, the swing-type inductor components described herein are operable with desired package size and desired efficiency that is generally beyond the capability of conventionally constructed surface mount swing-type inductor components.

Certain of the inductor components described include closed loop cores which are further advantageous in realizing much higher initial inductance without conventionally provided gaps between mating surfaces of core pieces. Specifically, the core pieces 106, 264, 324, 344, 442 and 462 in the above described components are notable in this regard, namely that they are single piece core structures without a physical gap introduced to closed magnetic path. Conventionally, in order to achieve high enough initial inductance, mirror polishing of mating surfaces of core pieces is required. Apart from cost, mirror polishing may affect stability of performance and introduce inconsistent performance characteristics of otherwise similar inductors.

The benefits and advantages of the inventive concepts disclosed are now believed to be evident in view of the exemplary embodiments disclosed.

An embodiment of a hybrid swing-type surface mount inductor component has been disclosed including a first discrete magnetic core piece fabricated from a first magnetic material having first magnetic properties and a second discrete magnetic core piece fabricated from a second magnetic material having second magnetic properties different from the first magnetic properties. An inverted U-section conductive coil includes a top section and first and second legs extending perpendicularly from the top section to establish a surface mount connection to a circuit board. The first and second discrete magnetic core pieces are assembled around a portion of the inverted U-section conductive coil, and the first and second discrete magnetic core pieces are operable to reach magnetic saturation at respectively different current loads applied to the inverted U-section conductive coil when the circuit board is energized. The magnetic saturation of each of the first and second discrete magnetic core pieces imparts multiple steps of inductance rolloff response to a range of current loads for the inductor component.

Optionally, the first and second discrete magnetic core pieces may be arranged in a vertical stack. The first and second discrete magnetic core pieces may each define a pair of interior vertically extending coil slots that are aligned with one another in the vertical stack, and the first and second legs may fully occupy the pairs of interior vertically extending aligned coil slots in the first and second discrete magnetic core pieces. The first and second discrete magnetic core pieces may have an equal length dimension and an equal width dimension. The first and second discrete magnetic core pieces may have an unequal height dimension.

As further options, the first discrete magnetic core piece may have a first height dimension and the second discrete magnetic core piece may have a second height dimension, wherein the top section is exposed on the top of the second discrete magnetic core piece at a distance from the circuit board about equal to the first height dimension plus the second height dimension. At least one of the first and second discrete magnetic core pieces may be formed with at least one physical gap.

The first and second discrete magnetic core pieces may optionally each define a pair of exterior vertically extending coil slots that are aligned with one another in the vertical stack, with the first and second legs only partly occupying the pair of exposed vertically extending coil slots in the first and second discrete core pieces. Third and fourth discrete core pieces that are arranged in a vertical stack may also be provided, wherein the third and fourth discrete core pieces each define a pair of exposed vertically extending coil slots that are aligned with one another in the vertical stack, and the first and second legs further only partly occupying the pairs of exposed vertically extending aligned coil slots in the third and fourth discrete core pieces. The first and second core pieces may have an unequal height dimension in the vertical stack. The first discrete magnetic core piece may have a first height dimension and the second discrete magnetic core piece may have a second height dimension, wherein the top section extends partly on the top of the second discrete magnetic core piece at a distance from the circuit board about equal to the first height dimension plus the second height dimension.

A third discrete magnetic core piece may also be provided and may oppose the first and second discrete magnetic core pieces, with the third discrete magnetic piece having a height dimension equal to a height dimension of the first magnetic core piece plus a height dimension of the second magnetic core piece. A third discrete magnetic core piece may likewise be provided and may be vertically stacked on the first magnetic core piece and arranged side-by-side with the second discrete magnetic core piece.

The first discrete magnetic core piece may optionally be formed with exterior vertically extending coil slots and the second discrete magnetic core piece may be formed with interior vertically extending coil slots. A third discrete magnetic core piece may also be provided and may oppose the first discrete magnetic core piece, and the second discrete magnetic core may overlie the first and third discrete magnetic core pieces. Further, a third discrete magnetic core piece may be provided and may be vertically stacked with the first and second discrete magnetic core pieces, and at least one of the first, second and third discrete magnetic core pieces defines a horizontal slot for the top section of the coil. At least one of the first, second and third magnetic core pieces may be formed with at least one physical gap.

As additional options, the first and second discrete magnetic pieces may be arranged side-by-side on opposing sides of the coil. The first and second discrete magnetic pieces may each include vertical coil slots respectively receiving only a portion of the legs of the coil. At least one of the first and second discrete magnetic core pieces may also be formed with a physical gap. The first discrete magnetic core piece and the second discrete magnetic core piece may also each include a horizontal coil slot that are respectively aligned with one another to receive the top section of the coil, and the first discrete magnetic core piece may be longer than the second discrete magnetic core piece.

The first discrete magnetic core piece and the second discrete magnetic core piece may each include a pair of horizontal coil slots that are aligned with one another; and the inverted U-section conductive coil may include a pair of top sections each having first and second legs extending perpendicularly from the top sections to establish a surface mount connection to a circuit board, with the second legs being joined to one another to realize a paralleled output from the inverted U-section conductive coil. At least one of the first discrete magnetic core piece and the second discrete magnetic core piece may also be formed with at least one physical gap.

An embodiment of a swing-type surface mount inductor component has also been disclosed including an inverted U-section conductive coil comprising a pair of top sections each respectively having first and second legs extending perpendicularly from the top sections to establish a surface mount connection to a circuit board. A magnetic core piece fabricated with first and second horizontal coil slots extending parallel to a plane of the circuit board, wherein the top sections extend through the respective first and second horizontal coil slots; and wherein the second legs are joined to one another to realize a paralleled output from the inverted U-section conductive coil. The magnetic core piece may be further formed with at least one physical gap.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hybrid swing-type surface mount inductor component comprising:

a first discrete magnetic core piece fabricated from a first magnetic material having first magnetic properties;

a second discrete magnetic core piece fabricated from a second magnetic material having second magnetic properties different from the first magnetic properties; and an inverted U-section conductive coil comprising a top section and first and second legs extending perpendicularly from the top section to establish a surface mount connection to a circuit board;

wherein the first discrete magnetic core piece is assembled around a top portion of the first and second legs of the U-section conductive coil and the second discrete magnetic core piece is assembled around a bottom portion of the first and second legs of the inverted U-section conductive coil, wherein the first discrete magnetic core piece comprises two parallel slots extending inside the first discrete magnetic core piece and the second magnetic core piece comprises two parallel slots extending inside the second discrete magnetic core piece; and wherein the first and second discrete magnetic core pieces are operable to reach magnetic saturation at respectively different current loads applied to the inverted U-section conductive coil when the circuit board is energized, the magnetic saturation of each of the first and second discrete magnetic core pieces imparting multiple steps of inductance rolloff response to a range of current loads for the inductor component.

2. The hybrid swing-type surface mount inductor component of claim 1, wherein the first and second discrete magnetic core pieces are arranged in a vertical stack.

3. The hybrid swing-type surface mount inductor component of claim 2, wherein the two parallel slots of the first magnetic core piece and the two parallel slots of the second magnetic core piece are aligned with one another in the vertical stack, and the first and second legs fully occupying the two parallel slots of the first magnetic core piece and the two parallel slots of the second magnetic core piece.

4. The hybrid swing-type surface mount inductor component of claim 3, wherein the first and second discrete magnetic core pieces have an equal length dimension and an equal width dimension.

5. The hybrid swing-type surface mount inductor component of claim 3, wherein the first and second discrete magnetic core pieces have an unequal height dimension.

6. The hybrid swing-type surface mount inductor component of claim 2, wherein the first discrete magnetic core piece has a first height dimension and wherein the second discrete magnetic core piece has a second height dimension, and wherein the top section is exposed on the top of the second discrete magnetic core piece at a distance from the circuit board about equal to the first height dimension plus the second height dimension.

7. The hybrid swing-type surface mount inductor component of claim 6, wherein at least one of the first and second discrete magnetic core pieces is formed with at least one physical gap.

8. The hybrid swing-type surface mount inductor component of claim 2, wherein the first and second discrete magnetic core pieces each define a pair of exterior vertically extending coil slots that are aligned with one another in the vertical stack, and the first and second legs only partly occupying the pair of exposed vertically extending coil slots in the first and second discrete core pieces.

9. The hybrid swing-type surface mount inductor component of claim 8, further comprising third and fourth discrete core pieces that are arranged in a vertical stack, wherein the third and fourth discrete core pieces each define a pair of exposed vertically extending coil slots that are aligned with one another in the vertical stack, and the first and second legs further only partly occupying the pairs of exposed vertically extending aligned coil slots in the third and fourth discrete core pieces.

10. The hybrid swing-type surface mount inductor component of claim 8, wherein the first and second core pieces have an unequal height dimension in the vertical stack.

11. The hybrid swing-type surface mount inductor component of claim 8, wherein the first discrete magnetic core piece has a first height dimension and wherein the second discrete magnetic core piece has a second height dimension, and wherein the top section extends partly on the top of the second discrete magnetic core piece at a distance from the circuit board about equal to the first height dimension plus the second height dimension.

12. The hybrid swing-type surface mount inductor component of claim 8, further comprising a third discrete magnetic core piece opposing the first and second discrete magnetic core pieces, the third discrete magnetic piece having a height dimension equal to a height dimension of the first magnetic core piece plus a height dimension of the second magnetic core piece.

13. The hybrid swing-type surface mount inductor component of claim 1, wherein the first discrete magnetic core piece is formed with exterior vertically extending coil slots and wherein the second discrete magnetic core piece is formed with interior vertically extending coil slots.

14. The hybrid swing-type surface mount inductor component of claim 13, further comprising a third discrete magnetic core piece opposing the first discrete magnetic core piece, and the second discrete magnetic core piece overlying the first and third discrete magnetic core pieces.

15. The hybrid swing-type surface mount inductor component of claim 2, further comprising a third discrete magnetic core piece vertically stacked on the first magnetic core piece and arranged side-by-side with the second discrete magnetic core piece.

16. The hybrid swing-type surface mount inductor component of claim 1, wherein the first and second discrete magnetic pieces are arranged side-by-side on opposing sides of the coil.

17. The hybrid swing-type surface mount inductor component of claim 16, wherein the first and second discrete magnetic pieces each include vertical coil slots respectively receiving only a portion of the legs of the coil.

18. The hybrid swing-type surface mount inductor component of claim 17, wherein at least one of the first and second discrete magnetic core pieces is further formed with a physical gap.

19. The hybrid swing-type surface mount inductor component of claim 16, wherein the first discrete magnetic core piece and the second discrete magnetic core piece each include a horizontal coil slot that are respectively aligned with one another to receive the top section of the coil.

20. The hybrid swing-type surface mount inductor component of claim 19, wherein the first discrete magnetic core piece is longer than the second discrete magnetic core piece.

21. The hybrid swing-type surface mount inductor component of claim 19, wherein at least one of the first and second discrete magnetic core pieces is formed with a physical gap.

22. The hybrid swing-type surface mount inductor component of claim 16, wherein the first discrete magnetic core piece and the second discrete magnetic core piece each include a pair of horizontal coil slots that are aligned with one another; and wherein the inverted U-section conductive coil comprises a pair of top sections each having first and second legs extending perpendicularly from the top sections to establish a surface mount connection to a circuit board, and wherein the second legs are joined to one another to realize a paralleled output from the inverted U-section conductive coil.

23. The hybrid swing-type surface mount inductor component of claim 22, wherein at least one of the first discrete magnetic core piece and the second discrete magnetic core piece is further formed with at least one physical gap.

24. The hybrid swing-type surface mount inductor component of claim 2, further comprising a third discrete magnetic core piece vertically stacked with the first and second discrete magnetic core pieces.

25. The hybrid swing-type surface mount inductor component of claim 24, wherein at least one of the first, second and third discrete magnetic core pieces defines a horizontal slot for the top section of the coil.

26. The hybrid swing-type surface mount inductor component of claim 24, wherein at least one of the first, second and third magnetic core pieces further is formed with at least one physical gap.

* * * * *